United States Patent [19]
Serizawa et al.

[11] Patent Number: 5,953,300
[45] Date of Patent: Sep. 14, 1999

[54] RECORDING DEVICE AND RECORDING METHOD

[75] Inventors: Makoto Serizawa, Takatsukisi; Aki Yoneda, Neyagawashi, both of Japan

[73] Assignee: Matsushita Electric Industrial Co., Ltd., Japan

[21] Appl. No.: 08/951,752

[22] Filed: Oct. 16, 1997

[30] Foreign Application Priority Data

Oct. 18, 1996 [JP] Japan ..................................... 8-276664

[51] Int. Cl.$^6$ ....................................................... G11B 7/00
[52] U.S. Cl. .............................. 369/60; 369/59; 369/58; 369/50
[58] Field of Search ................................ 369/47, 48, 49, 369/50, 54, 58, 59, 60, 32; 360/48, 51

[56] References Cited

U.S. PATENT DOCUMENTS

| | | |
|---|---|---|
| 4,607,346 | 8/1986 | Hill . |
| 5,559,777 | 9/1996 | Maeda et al. .............................. 369/50 |
| 5,802,026 | 9/1998 | Tsukihashi ............................. 369/60 X |

FOREIGN PATENT DOCUMENTS

| | | |
|---|---|---|
| 0780758 | 6/1997 | European Pat. Off. . |
| 61-221860 | 10/1986 | Japan . |
| 6-83708 | 3/1994 | Japan . |
| 7-334448 | 12/1995 | Japan . |

*Primary Examiner*—Muhammad N. Edun
*Attorney, Agent, or Firm*—Parkhurst & Wendel, L.L.P.

[57] ABSTRACT

Disclosed is a recording device for recording data in a recording/reproduction device using a recording medium in which the recording-rate performance showing the recordable data quantity per unit time varies area to area. The recording device comprises a data memory unit for temporarily storing data to be recorded; a data quantity management unit for managing the quantity of data in the memory unit, and requesting execution of writing data in the recording medium; a medium area management unit for managing an available area in the recording medium, and deciding a data write position; and a data transfer control unit for controlling transfer of data from the data memory unit to the recording/reproduction device according to the write position generated by the medium area management unit. The medium area management unit includes an area-division management section for dividing the recording medium into plural speed areas of different recording-rate performances, and managing the speed areas. The data quantity management unit includes a recording rate control unit for setting a rate of recording the data stored in the data memory unit according to the quantity of the data stored in the data memory unit. The speed areas on which data are to be recorded are switched on the basis of the recording rate set by the recording rate control unit. Therefore, the medium is used efficiently without being restricted by the recording-rate performance of a lower-speed area in the medium.

36 Claims, 21 Drawing Sheets

RECORDING DEVICE AND RECORDING METHOD

FIELD OF THE INVENTION

The present invention relates to a device and a method for recording data in a recording and reproduction device using a recording medium in which the recordable data quantity per unit time varies area to area, such as a hard disk unit or an optical disk unit using a disk type recording medium. More specifically, the invention relates to a device for recording real-time continuous data such as video and audio data. The invention also relates to a recording method using such a recording device.

BACKGROUND OF THE INVENTION

In recent years, with the spread of PCs (Personal Computers) equipped with AV (Audio Visual) functions or video/audio communication through Internet, a demand for high-capacity and high-speed disk type recording media for recording and reproducing video/audio data has increased.

To meet the demand, various kinds of recording and reproduction devices employing disk type recording media, such as magnetic disks and optical disks, have been proposed. Especially, rewritable optical disk units that are removable using cartridges (hereinafter, referred to simply as 'optical disks'), such as optical magnetic disks and phase changeable optical disks, have spread rapidly because these disks are easy to handle and have large capacities.

However, compared with hard disk units employing magnetic disks (hereinafter, referred to simply as 'hard disks'), optical disks are, by one figure or more, lower in seek time and data transfer speed than the hard disks. Hence, optical disks are likely to be used restrictively for purposes of relatively low access frequency, such as backup.

On the other hand, moving picture compression techniques of MPEG (Moving Picture Experts Group) system make a rapid transition from MPEG1 to MPEG2. With this transition, required bit rate increases significantly, for example, the bit rate required for MPEG2 DVD (Digital Versatile Disc) is 3~11 Mbps while the bit rate required for MPEG1 video CD is only 1.5 Mbps. Therefore, in authoring units for business use, expensive disks like the newest high-speed disks or RAID (Redundant Array of Inexpensive Disks) are employed. Further, large-capacity and high-speed hard disks for PCs and the like have been proposed in recent years. However, with the MPEG2 class data rate, it is difficult to secure real-time recording.

As described above, hard disks and optical disks are required to have higher processing speed for recording/ reproduction of real-time continuous data such as video data and audio data.

In recent disk type recording media, to increase memory capacity and recording density, adopted is a method of dividing a disk into plural sub-areas and increasing the number of sectors per track in each area from the inner circumference toward the outer circumference, represented by a Z-CAV (Zone-Constant Angular Velocity) method. For example, according to the standard of a phase changeable optical disk, this disk is divided into ten areas, and an area at the innermost circumference of the disk has 30 sectors per track. The sector number increases by 4 sectors per track in each area toward the outer circumference. An area at the outermost circumference has 66 sectors per track, that is, 36 sectors per track are increased as compared with the innermost circumference. The disk is rotated at a constant rotation speed, and the frequency of recording/reproduction is changed area to area. That is, in this standard, the recording/ reproduction rate at the outermost circumference is more than twice the recording/reproduction rate at the innermost circumference (by simple calculation, 66/30=2.2 times).

As described above, in the disk type recording media, the recording/reproduction rate, i.e., the recordable/ reproducible data quantity per unit time varies area to area and, generally, it is higher at the outer circumference than at the inner circumference. However, in an application in which continuous data is recorded and reproduced, like MPEG, real-time recording/reproduction of data of a predetermined quantity per unit time is required. Therefore, when disk type recording media are used, the recording rate (the quantity of data to be recorded in the unit time) is set to that of an area of the lowest speed, or only areas of recording-rate performances (the quantities of data recordable in the unit time) exceeding the recording rate are used. Consequently, in the existing circumstances, efficient use of disk media is impossible.

By the way, the smallest unit of a recording area managed by a disk unit is called 'sector', and a sector is 512 bytes in a hard disk. It is generally known that, in a disk unit, higher-speed recording/reproduction is realized by recording/reproducing a larger quantity of data at one time.

For example, in an operating system (OS) for PC, a file allocation size, which is the smallest unit of area management in a disk unit having a capacity of 500 MB~1 GB, is about 16 kB. However, if circumstances permit, actual recording/reproduction is carried out with a file allocation size of 32 kB~64 kB. To increase the file allocation size, a method called 'delay writing' is used for writing of data in the disk unit, whereby a high-speed file system is implemented. In this method, when a request to write data in the disk unit (hereinafter, referred to simply as request-to-write) is given, data to be written is temporarily stored in a write buffer provided on a main memory and, without waiting for completion of actual writing of data in the disk unit, the request-to-write is completed. Thereby, while the write buffer on the main memory functions effectively, the request-to-write can be ended in a moment, viewed from the application program.

However, when the write buffer on the main memory is filled up, requests-to-write after that are stood by unit a capacity corresponding to the data quantity requested by the request-to-write is secured in the write buffer. At this time, the data in the write buffer decrease at the recording rate of data into the disk unit, if the writing in the disk unit is carried out on the area of the lowest rate, the request-to-write is processed at a recording rate equal to the lowest rate. Accordingly, in case of processing continuous data like video and audio data, when data is generated at a rate (quantity of data per unit time) larger than the recording-rate performance of the lowest-speed area in the disk, the write buffer on the main memory will be filled up soon. Depending on the area on which data is being written, there is a risk that the data generating process is ended in the middle or a portion of generated data is lost.

Further, in a standard file system of PC, it is impossible to perform recording by designating an area of a recording medium from an application program. So, in order to use only high-speed areas, low-speed areas must be isolated, leading to a reduction in the capacity.

SUMMARY OF THE INVENTION

It is an object of the present invention to provide a device and a method for recording data in a recording medium in which the recordable data quantity per unit time varies area to area, that can use the recording medium efficiently without being restricted by the recording-rate performance of a low-speed area in the recording medium and that can realize continuous reading of data at reproduction with less buffer memories.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the invention, there is provided a recording device for recording data in a recording/reproduction device using a recording medium in which the recording-rate performance showing the recordable data quantity per unit time varies area to area, and the recording device comprises: a data memory unit for temporarily storing data to be recorded; a data quantity management unit for managing the quantity of data in the memory unit, and requesting execution of writing data in the recording medium; a medium area management unit for managing an available area in the recording medium, and deciding a data write position; a data transfer control unit for controlling transfer of data from the data memory unit to the recording/reproduction device according to the write position generated by the medium area management unit; the medium area management unit including an area-division management means for dividing the recording medium into plural speed areas of different recording-rate performances, and managing the speed areas; and the data quantity management unit including a recording rate control means for setting a rate of recording the data stored in the data memory unit according to the quantity of the data stored in the data memory unit; wherein the speed areas on which data are to be recorded are switched on the basis of the recording rate set by the recording rate control means.

According to a second aspect of the present invention, in the above-mentioned recording device, the area-division management means forms the speed area for each of plural regions into which an address at writing of data into the medium is divided.

According to a third aspect of the present invention, in the above-mentioned recording device, the area-division management means divides the recording medium into a high-speed area and a low-speed area according to the recording-rate performances of the respective areas, and manages these areas; the data quantity management unit has first and second set values to be compared with the quantity of data in the data memory unit; and the recording-rate control means generates a request to switch the recording area from the low-speed area to the high-speed area when it is decided that the data quantity in the data memory unit exceeds the first set value for switching to the high-speed area, while it generates a request to switch the speed area from the high-speed area to the low-speed area when it is decided that the data quantity in the data memory unit is lower than the second set value for switching to the low-speed area.

According to a fourth aspect of the present invention, in the above-mentioned recording device, the division of the recording medium into plural speed areas by the area-division management unit is to divide the medium into N+1 areas from a lowest-speed area, according to the recording-rate performances of the respective areas; the data quantity management unit has N pieces of first set values and N pieces of second set values to be compared with the data quantity in the data memory unit, respectively corresponding to N pieces of speed-area boundaries produced by the N+1 pieces of speed areas; and the recording-rate control means generates a request to switch the recording area to the (S+1)th speed area when it is decided that the data quantity in the data memory unit exceeds the S-th first set value, while it generates a request to switch the recording area to the T-th speed area when it is decided that the data quantity in the data memory unit is lower than the T-th second set value.

According to a fifth aspect of the present invention, in the above-mentioned recording device, the data quantity management unit has first and second set values to be compared with the quantity of data stored in the data memory unit, which values are updated at the speed-area switching; the recording-rate control means generates a first request to switch the recording area to a higher-speed area when it is decided that the data quantity in the data memory unit exceeds the first set value for switching to a higher-speed area, while it generates a second request to switch the recording area to a lower-speed area when it is decided that the data quantity in the data memory unit is lower than the second set value for switching to a lower-speed area; and the area-division management means switches the speed area being currently selected to a higher-speed area in response to the first request, and switches the speed-area being currently selected to a lower-speed area in response to the second request.

According to a sixth aspect of the present invention, in the above-mentioned recording device, the division of the medium into plural speed areas by the area-division management unit is to divide the medium into N pieces of speed areas from a lowest-speed area according to the recording-rate performances of the respective areas; the data quantity management unit includes a recording rate setting/detecting means for setting or detecting a recording rate that shows a data quantity per unit time, requested to be recorded; the area-division management means includes a speed-area grouping means for grouping the speed areas into which the medium is divided, into two groups, i.e., a high-speed area group comprising S to N pieces of speed areas whose recording-rate performances are higher than the recording rate and a low-speed area group comprising 1 to T pieces of speed areas whose recording-rate performances are lower than the recording rate; and, after establishing an effective grouping with respect to the recording rate by the speed-area grouping means, the area-division management means receives a request to switch the recording area to a higher-speed area from the recording-rate control means and selects a speed area in the high-speed area group in a prescribed order, while it receives a request to switch the recording area to a lower-speed area from the recording-rate control means and selects a speed area in the low-speed area group in a prescribed order.

According to a seventh aspect of the present invention, in the above-mentioned recording device, the recording rate setting/detecting means detects that a speed area lower than the recording rate is being selected by detecting that the quantity of data in the data memory unit increases, and its detects that a speed area higher than the recording rate is being selected by detecting that the quantity of data in the data memory unit decreases.

According to an eighth aspect of the present invention, in the above-mentioned recording device, the recording rate setting/detecting means sets the recording rate according to a variation per unit time in the data quantity in the data memory unit or the data quantity per unit time input to the data memory unit.

According to a ninth aspect of the present invention, in the above-mentioned recording device, the data quantity management unit has a pair of inter-group switching set values for switching between the speed-area groups, and a pair of intra-group switching set values for switching between the speed areas in a selected speed-area group; the recording-rate control means generates a request to switch the recording area group from the low-speed area group to the high-speed area group when it is decided that the data quantity in the data memory unit exceeds one of the inter-group switching set values that is for switching to the high-speed area group; the recording-rate control means generates a request to switch the recording area group from the high-speed area group to the low-speed area group when it is decided that the data quantity in the data memory unit is lower than one of the inter-group switching set values that is for switching to the low-speed area group; the recording-rate control means generates a request to switch the speed area being currently selected to a higher-speed area within the selected area group when it is decided that the data quantity in the data memory unit exceeds one of the intra-group switching set values that is for switching the selected speed area to a higher-speed area in the selected group; and the recording-rate control means generates a request to switch the speed area being currently selected to a lower-speed area within the selected area group when it is decided that the data quantity in the data memory unit is lower than one of the intra-group switching set values that is for switching the selected speed area to a lower-speed area in the selected group.

According to a tenth aspect of the present invention, in the above-mentioned recording device, the area-division management means includes an area-speed catalog means for dividing the medium into N pieces of speed areas from a lowest-speed area according to recording-rate performances of the respective areas, and cataloging the recording-rate performances of the respective speed areas or differences between the recording rate and the respective recording-rate performances; and, on the basis of the information cataloged in the area-speed catalog means, the differences between the recording rate and the recording-rate performances are evaluated to select a speed area.

According to an eleventh aspect of the present invention, in the above-mentioned recording device, in each of the area groups, the area-division management means performs the selection in the order from a speed area of a largest difference between its recording-rate performance and the recording rate to a speed area of a smallest difference between its recording-rate performance and the recording rate.

According to a twelfth aspect of the present invention, in the above-mentioned recording device, the data quantity management unit includes a recording rate setting/selecting means for setting or detecting the recording rate; the area-division management means includes a speed-area grouping means for grouping the speed areas into which the medium is divided, into two groups, i.e., a high-speed area group comprising speed areas whose recording-rate performances are higher than the recording rate and a low-speed area group comprising speed areas whose recording-rate performances are lower than the recording rate, and the order of speed areas to be selected for switching in one of the area groups is the forward order of addresses of recording/reproduction blocks in the recording/reproduction device while the order of speed areas to be selected for switching in the other area group is the backward order of addresses of recording/reproduction blocks in the recording/reproduction device; the data quantity management unit has a pair of inter-group switching set values for switching between the speed-area groups, and a pair of intra-group switching set values for switching between the speed areas in a selected speed-area group; the recording-rate control means generates a request to switch the recording area group from the low-speed area group to the high-speed area group when it is decided that the data quantity in the data memory unit exceeds one of the inter-group switching set values that is for switching to the high-speed area group; the recording-rate control means generates a request to switch the recording area group from the high-speed area group to the low-speed area group when it is decided that the data quantity in the data memory unit is lower than one of the inter-group switching set values that is for switching to the low-speed area group; the recording-rate control means selects the speed areas in the selected area group in the order set by the speed-area grouping means when it is decided that the data quantity in the data memory unit is larger than or smaller than the intra-group switching set values; and the time required for the speed-area switching increases with an increase in variation in the addresses corresponding to the recording/reproduction blocks of the recording/reproduction device.

According to a thirteenth aspect of the present invention, in the above-mentioned recording device, a method of dividing the medium into plural speed areas is changed with a change in the recording rate.

According to a fourteenth aspect of the present invention, in the above-mentioned recording device, a method of grouping the speed areas is changed with a change in the recording rate.

According to a fifteenth aspect of the present invention, in the above-mentioned recording device, the set value of the data quantity management unit changes with a change in the recording rate.

According to a sixteenth aspect of the present invention, in the above-mentioned recording device, the data quantity management unit includes a recording rate setting/detecting means for setting or detecting the recording rate; the area-division management unit includes a speed area selecting means for evaluating a quantity of data to be recorded, requested to each of the speed areas, from a variation per unit time in the data quantity of the data memory unit, to the recording rate, in each of the speed areas, and from a time required for switching to the speed area, and selecting and scheduling a speed area corresponding to the capacity of the data memory unit, in each area group; and the set value for generating a request to switch the speed area selected by comparing the set value with the data quantity in the data memory unit is reset at every one cycle for selecting the low-speed area group and the high-speed area group, each by one time or several times.

According to a seventeenth aspect of the present invention, in the above-mentioned recording device, when a speed area selected by the area-division management means is switched to another speed area, the switching is performed according to a result of comparison of the quantity of data recorded in the selected speed area with a prescribed value.

According to an eighteenth aspect of the present invention, in the above-mentioned recording device, when a speed area selected by the area-division management means is switched to another speed area, the switching is performed by detecting that the quantity of data recorded in the selected speed area exceeds a prescribed value.

According to a nineteenth aspect of the present invention, there is provided a method of recording data in a recording/reproduction device using a recording medium in which the recording-rate performance showing the recordable data quantity per unit time vary area to area, and the method comprises a data memory step of temporarily storing data to be recorded; a data quantity management step of managing the quantity of data in the data memory step, and requesting execution of writing data in the recording medium; a medium area management step of managing an available area in the recording medium, and deciding a data write position; a data transfer control step of controlling transfer of data from the data memory step to the recording/reproduction device according to the write position generated in the medium area management step; the medium area management step including an area-division management step of dividing the recording medium into plural speed areas of different recording-rate performances, and managing the speed areas; and the data quantity management step including a recording rate control step of setting a rate of recording the data stored in the data memory step according to the quantity of the data stored in the data memory step; wherein the speed areas on which data are to be recorded are switched on the basis of the recording rate set in the recording rate control step.

According to a twentieth aspect of the present invention, in the above-mentioned method, the area-division management step forms the speed area for each of plural regions into which an address at writing of data into the medium is divided.

According to a twenty-first aspect of the present invention, in the above-mentioned method, the area-division management step divides the recording medium into a high-speed area and a low-speed area according to the recording-rate performances of the respective areas, and manages these areas; the data quantity management step has first and second set values to be compared with the quantity of data in the data memory step; and the recording-rate control step generates a request to switch the recording area from the low-speed area to the high-speed area when it is decided that the data quantity in the data memory step exceeds the first set value for switching to the high-speed area, while it generates a request to switch the recording area from the high-speed area to the low-speed area when it is decided that the data quantity in the data memory step is lower than the second set value for switching to the low-speed area.

According to a twenty-second aspect of the present invention, in the above-mentioned method, the division of the recording medium into plural speed areas in the area-division management step is to divide the medium into N+1 areas from a lowest-speed area, according to the recording-rate performances of the respective areas; the data quantity management step has N pieces of first set values and N pieces of second set values to be compared with the data quantity in the data memory step, respectively corresponding to N pieces of speed-area boundaries produced by the N+1 pieces of speed areas; and the recording-rate control step generates a request to switch the recording area to the (S+1)th speed area when it is decided that the data quantity in the data memory step exceeds the S-th first set value, while it generates a request to switch the recording area to the T-th speed area when it is decided that the data quantity in the data memory step is lower than the T-th second set value.

According to a twenty-third aspect of the present invention, in the above-mentioned method, the data quantity management step has first and second set values to be compared with the quantity of data stored in the data memory step, which values are updated at the speed-area switching; the recording-rate control step generates a first request to switch the recording area to a higher-speed area when it is decided that the data quantity in the data memory step exceeds the first set value for switching to a higher-speed area, while it generates a second request to switch the recording area to a lower-speed area when it is decided that the data quantity in the data memory step is lower than the second set value for switching to a lower-speed area; and the area-division management step switches the speed area being currently selected to a higher-speed area in response to the first request, and switches the speed-area being currently selected to a lower-speed area in response to the second request.

According to a twenty-fourth aspect of the present invention, in the above-mentioned method, the division of the medium into plural speed areas in the area-division management step is to divide the medium into N pieces of speed areas from a lowest-speed area according to the recording-rate performances of the respective areas; the data quantity management step includes a recording rate setting/detecting step of setting or detecting a recording rate that shows a data quantity per unit time, requested to be recorded; the area-division management step includes a speed-area grouping step for grouping the speed areas into which the medium is divided, into two groups, i.e., a high-speed area group comprising S to N pieces of speed areas whose recording-rate performances are higher than the recording rate and a low-speed area group comprising 1 to T pieces of speed areas whose recording-rate performances are lower than the recording rate; and after establishing an effective grouping with respect to the recording rate in the speed-area grouping step, the area-division management step receives a request to switch the recording area to a higher-speed area from the recording-rate control step and selects a speed area in the high-speed area group in a prescribed order, while it receives a request to switch the recording area to a lower-speed area from the recording-rate control step and selects a speed area in the low-speed area group in a prescribed order.

According to a twenty-fifth aspect of the present invention, in the above-mentioned method, the recording rate setting/detecting step detects that a speed area lower than the recording rate is being selected by detecting that the quantity of data in the data memory step increases, and it detects that a speed area higher than the recording rate is being selected by detecting that the quantity of data in the data memory step decreases.

According to a twenty-sixth aspect of the present invention, in the above-mentioned method, the recording rate setting/detecting step sets the recording rate according to a variation per unit time in the data quantity in the data memory step or the data quantity per unit time input to the data memory step.

According to a twenty-seventh aspect of the present invention, in the above-mentioned method, the data quantity management step has a pair of inter-group switching set values for switching between the speed-area groups, and a pair of intra-group switching set values for switching between the speed areas in a selected speed-area group; the recording-rate control step generates a request to switch the recording area from the low-speed area group to the high-speed area group when it is decided that the data quantity in the data memory step exceeds one of the inter-group switching set values that is for switching to the high-speed area group; the recording-rate control step generates a request to switch the recording area from the high-speed area group to the low-speed area group when it is decided that the data quantity in the data memory step is lower than one of the inter-group switching set values that is for switching to the low-speed area group; the recording-rate control step generates a request to switch the speed area being currently selected to a higher-speed area within the selected area group when it is decided that the data quantity in the data memory step exceeds one of the intra-group switching set values that is for switching the selected speed area to a higher-speed area in the selected group; and the recording-rate control step generates a request to switch the speed area being currently selected to a lower-speed area within the selected area group when it is decided that the data quantity in the data memory step is lower than one of the intra-group switching set values that is for switching the selected speed area to a lower-speed area in the selected group.

According to a twenty-eighth aspect of the present invention, in the above-mentioned method, the area-division management step includes an area-speed catalog step for dividing the medium into N pieces of speed areas from a lowest-speed area according to recording-rate performances of the respective areas, and cataloging the recording-rate performances of the respective speed areas or differences between the recording rate and the respective recording-rate performances; and, on the basis of the information cataloged in the area-speed catalog step, the differences between the recording rate and the recording-rate performances are evaluated to select a speed area.

According to a twenty-ninth aspect of the present invention, in the above-mentioned method, for each of the area groups, the area-division management step performs the selection in the order from a speed area of a largest difference between its recording-rate performance and the recording rate to a speed area of a smallest difference between its recording-rate performance and the recording rate.

According to a thirtieth aspect of the present invention, in the above-mentioned method, the data quantity management step includes a recording rate setting/selecting step for setting or detecting the recording rate; the area-division management step includes a speed-area grouping step for grouping the speed areas into which the medium is divided, into two groups, i.e., a high-speed area group comprising speed areas whose recording-rate performances are higher than the recording rate and a low-speed area group comprising speed areas whose recording-rate performances are lower than the recording rate, and the order of speed areas to be selected for switching in one of the area groups is the forward order of addresses of recording/reproduction blocks in the recording/reproduction device while the order of speed areas to be selected for switching in the other area group is the backward order of addresses of recording/reproduction blocks in the recording/reproduction device; the data quantity management step has a pair of inter-group switching set values for switching between the speed-area groups, and a pair of intra-group switching set values for switching between the speed areas in a selected speed-area group; the recording-rate control step generates a request to switch the recording area group from the low-speed area group to the high-speed area group when it is decided that the data quantity in the data memory step exceeds one of the inter-group switching set values that is for switching to the high-speed area group; the recording-rate control step generates a request to switch the recording area group from the high-speed area group to the low-speed area group when it is decided that the data quantity in the data memory step is lower than one of the inter-group switching set values that is for switching to the low-speed area group; the recording-rate control step selects the speed areas in the selected area group in the order set in the speed-area grouping step when it is decided that the data quantity in the data memory step is larger than or smaller than the intra-group switching set values; and the time required for the speed-area switching increases with an increase in variation in the addresses corresponding to the recording/reproduction blocks of the recording/reproduction device.

According to a thirty-first aspect of the present invention, in the above-mentioned method, a method of dividing the medium into plural speed areas is changed with a change in the recording rate.

According to a thirty-second aspect of the present invention, in the above-mentioned method, a method of grouping the speed areas is changed with a change in the recording rate.

According to a thirty-third aspect of the present invention, in the above-mentioned method, the set value in the data quantity management step changes with a change in the recording rate.

According to a thirty-fourth aspect of the present invention, in the above-mentioned method, the data quantity management step includes a recording rate setting/detecting step for setting or detecting the recording rate; the area-division management step includes a speed area selecting step in which a quantity of data to be recorded, requested to each of the speed areas, is evaluated from a variation per unit time in the data quantity in the data memory step, to the recording rate, in each of the speed areas, and a time required for switching to the speed area and, thereafter, a speed area corresponding to the capacity of the data memory step is selected from each area group and scheduled; and the set value for generating a request to switch the speed area selected by comparing the set value with the data quantity in the data memory step is reset at every one cycle for selecting the low-speed area group and the high-speed area group, each by one time or several times.

According to a thirty-fifth aspect of the present invention, in the above-mentioned method, when a speed area selected in the area-division management step is switched to another speed area, the switching is performed according to a result of comparison of the quantity of data recorded in the selected speed area with a prescribed value.

According to a thirty-sixth aspect of the present invention, in the above-mentioned method, when a speed area selected in the area-division management step is switched to another speed area, the switching is performed by detecting that the quantity of data recorded in the selected speed area exceeds a prescribed value.

DETAILED DESCRIPTION OF THE PREFERRED EMBODIMENTS

Figure 1:
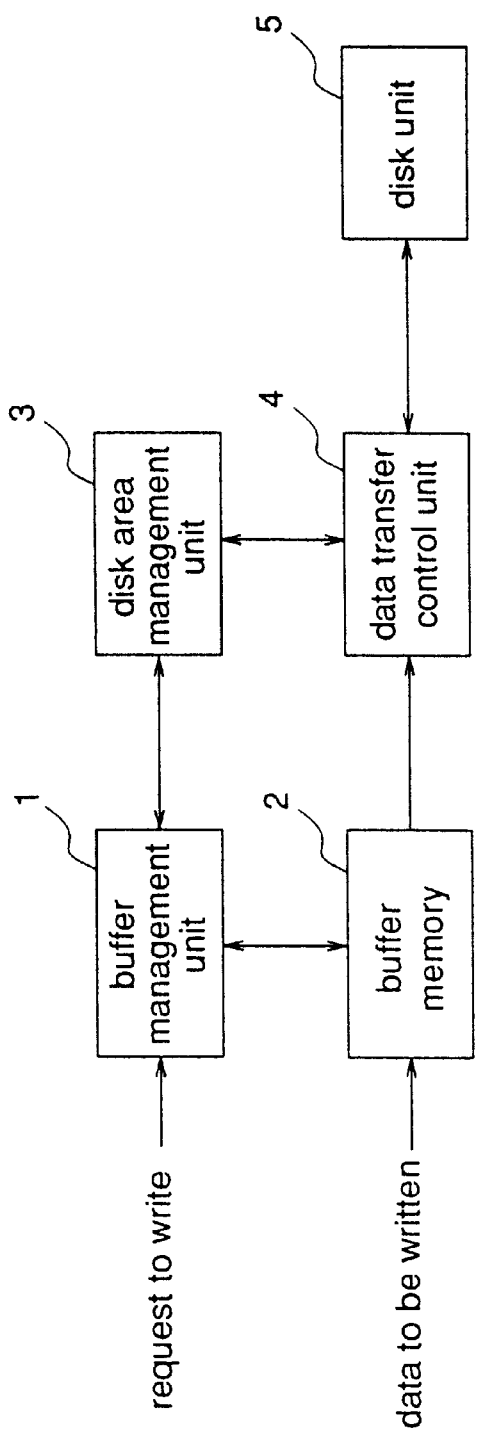
FIG. 1 is a block diagram illustrating a fundamental structure of a recording device according to a first embodiment of the invention.

FIG. 1 is a functional block diagram illustrating a fundamental structure of a recording device according to the present invention.

With reference to FIG. 1, the recording device is for recording data in a disk unit 5 using a disk medium in which the recording-rate performance per unit time varies area to area. The recording device comprises a buffer memory 2 for temporarily storing data to be recorded, a buffer management unit 1 for managing the quantity of data stored in the buffer memory 2 and requesting execution of data writing on the disk medium, a disk area management unit 3 for managing available areas in the disk medium and deciding a write position, and a data transfer control unit 4 for controlling data transfer from the buffer memory 2 to the disk unit 5 according to the write position generated in the disk area management unit 3.

The buffer management unit 1 manages the condition of the buffer memory 2. Receiving a request to write data in the disk medium, the buffer management unit 1 stores data to be written, in the buffer memory 2, and outputs a request to transfer the data to the disk unit 5, according to the quantity of data stored in the buffer memory 2, toward the disk area management unit 3.

The disk area management unit 3 reads disk management information recorded on the disk medium in the disk unit 5 through the data transfer control unit 4, and manages available areas on the disk medium. Further, on the basis of the data transfer request from the buffer management unit 1, the unit 3 allocates an area on the disk medium where data is to be recorded, and generates a transfer size of data to be transferred from the buffer memory 2 to the disk unit 5 and an address showing a write position on the destination disk medium.

The data transfer control unit 4 transfers the data in the buffer memory 2 to the disk unit 5 according to the address and the transfer size generated in the disk area management unit 3, and records the data in the disk unit 5.

The recording device according to the present invention is characterized by the following units and means. The disk area management unit 3 includes an area-division management means for dividing the disk medium into plural subareas of different recording speeds (hereinafter referred to as speed areas) utilizing differences in recording-speed performances of these areas. The buffer management unit 1 includes a data recording speed setting means for requesting a change to a higher-speed area or a lower-speed area on the basis of the quantity of data stored in the buffer memory 2. The disk area management unit 3 changes the speed area on which data is to be recorded, according to the request from the data recording speed setting means.

A description is given of a method of dividing the disk medium into plural speed areas.

In a computer system of a PC or the like, a sector, which is the smallest recording unit on a disk medium, is shown using a logical block address. This logical block address is converted to a physical position of a sector on the disk medium in a disk unit. However, the logical block address is usually given so as to successively increase in number from the outer circumference to the inner circumference of the disk medium, or vice versa, along the rotational direction of tracks on the disk medium. Also in the case of a phase changeable optical disk mentioned above, when the number of sectors for data possessed by each area is found, an area where the sector belongs is known from the logical block address, except a sector detected after format and processed substitutionally. That is, it is possible to designate a speed area for recording by the logical block address. In order to perform recording on the designated speed area, the area-division management means allocates an available area from the address region corresponding to the speed area.

[Embodiment 1]

Figure 2:
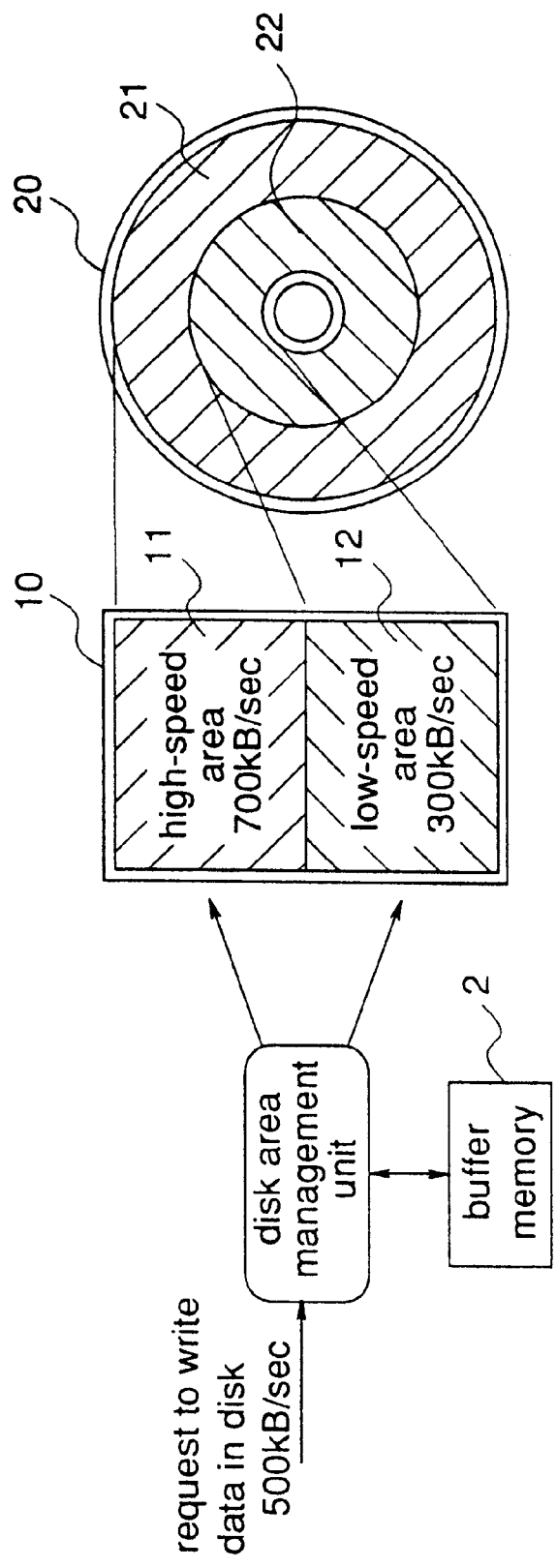
FIG. 2 is a block diagram illustrating a main structure of the recording device according to the first embodiment.

FIG. 2 is a block diagram illustrating a main structure of a recording device according to a first embodiment of the invention.

The recording device according to the first embodiment is applicable when a disk medium is divided into two speed areas and managed. As shown in FIG. 2, a data recording area 10 is divided into a high-speed area 11 and a low-speed area 12, and the high-speed area 11 corresponds to an outer area 21 of a disk medium 20 while the low-speed area 12 corresponds to an inner area 22 of the disk medium 20.

Figure 3:
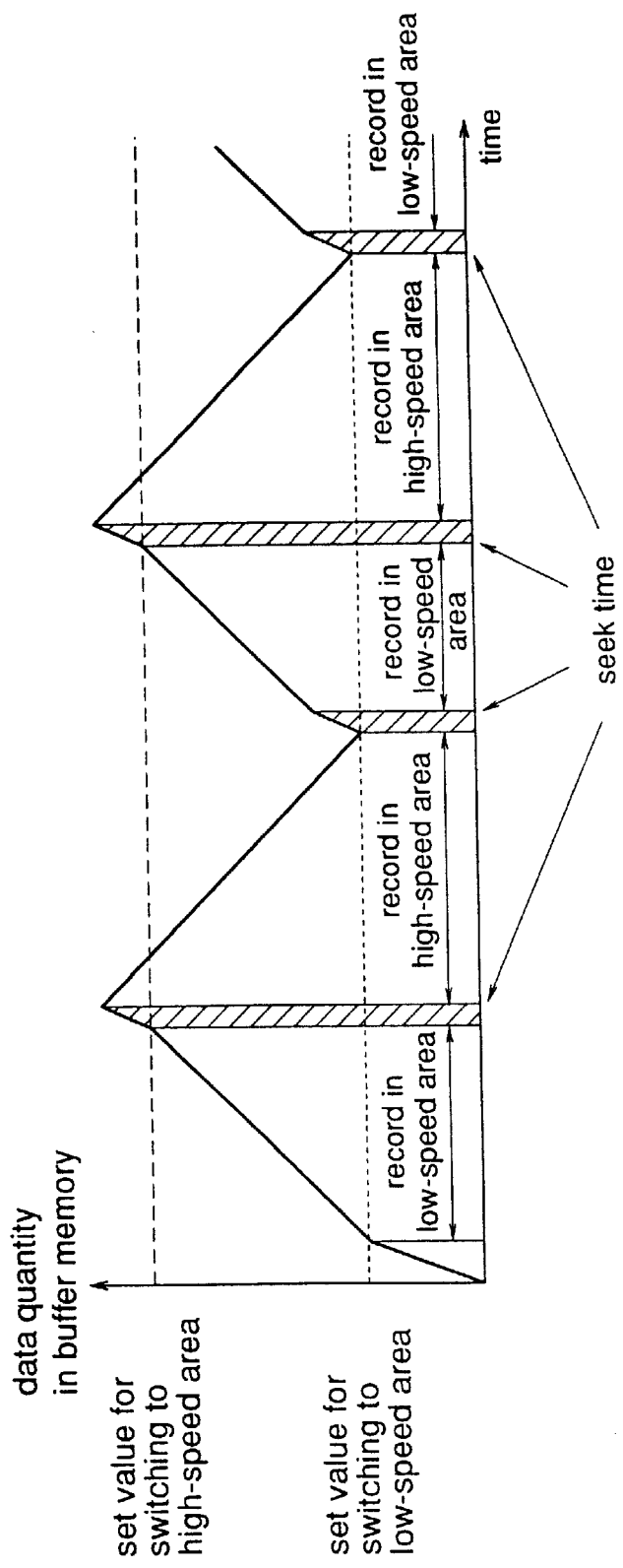
FIG. 3 is a diagram for explaining a recording operation of the recording device on the basis of the quantity of data in a buffer memory.

FIG. 3 is a diagram for explaining the recording operation of the recording device on the basis of the quantity of data in the buffer memory.

With reference to FIG. 3, the recording operation will be described hereinafter, using parameters of shown in table 1.

TABLE 1

| recording rate | 500 kB/sec |
|---|---|
| recording-rate performance in high-speed area | 700 kB/sec |
| recording-rate performance in low-speed area | 300 kB/sec |

When a request to write data in the disk unit 5 (hereinafter referred to simply as a request-to-write) is generated, storage of data in the buffer memory 2 is started. The data quantity in the buffer memory 2 increases by 500 kB/sec.

Next, writing of data in the low-speed area of the disk unit 5 is performed. During the writing, the data quantity in the buffer memory 2 increases by 200 kB/sec which is a difference between the recording rate and the recording-rate performance of the low-speed area 12. When the data quantity in the buffer memory 2 reaches a set value for switching to the high-speed area 11 (first set value), the buffer management unit 1 requests the disk area management unit 3 to record data on the high-speed area 11. Receiving the request from the buffer management unit 1, the disk area management unit 3 changes the mode to address generation in the high-speed area 11. In the disk unit 5, seeking of a recording head from the low-speed area 12 to the high-speed area 11 is performed. During the seeking operation, since the recording head is moving to the designated position, writing of data in the disk medium is not performed. So, the data quantity in the buffer memory 2 increases at the recording rate, that is, 500 kB/sec.

Next, writing of data in the high-speed area 11 is performed. During the writing, the data quantity in the buffer memory 2 decreases by 200 kB/sec which is a difference between the recording rate and the recording-rate performance of the high-speed area 11.

When the data quantity in the buffer memory 2 reaches a set value for switching to the low-speed area 12 (second set value), the buffer management unit 1 requests the disk area management unit 3 to record data on the low-speed area 12. Receiving the request from the buffer management unit 1, the disk area management unit 3 changes the mode to address generation in the low-speed area 12. In the disk unit 5, seeking of the recording head from the high-speed area 11 to the low-speed area 12 is performed. During the seeking operation, since the recording head is moving to the designated position, writing of data in the disk medium is not performed. So, the data quantity in the buffer memory 2 increases at the recording rate, that is, 500 kB/sec.

Next, writing of data in the low-speed area 12 is performed in the same manner as mentioned above. Thereafter, the above-mentioned procedure is repeated until the request-to-write is completed.

Figure 4:
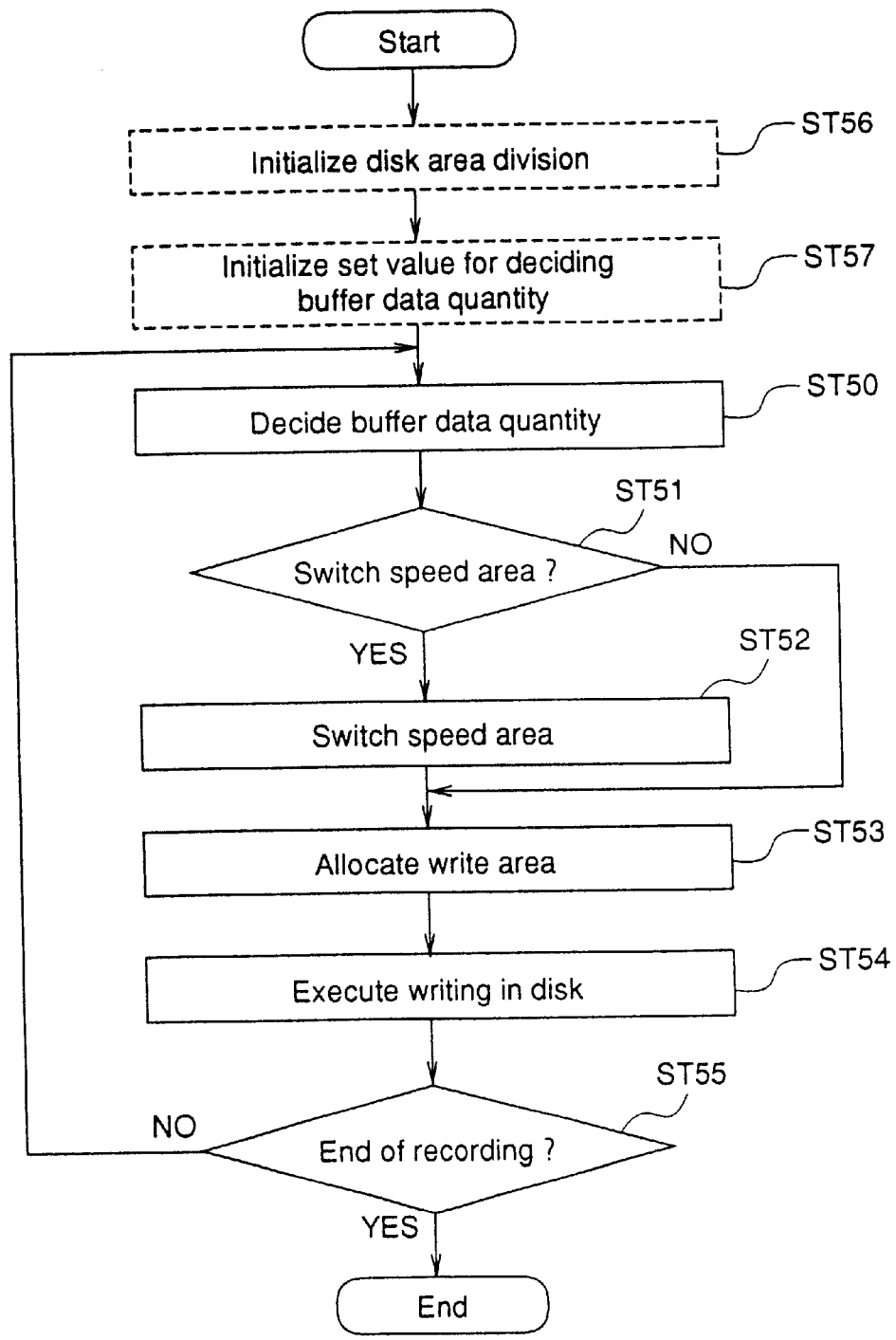
FIG. 4 is a flowchart showing how to control the recording operation of the recording device.

FIG. 4 is a flowchart for explaining how to control the above-mentioned recording operation.

With reference to FIG. 4, before starting the data recording operation, the data area of the disk medium is divided into plural sub-areas, i.e., speed areas (initialization step ST56 for disk area division). Next, a data quantity to be compared with the data quantity in the buffer memory 2 for deciding switching between the speed areas is set (initialization step ST57 for setting a value for deciding buffer data quantity).

The writing operation of data in the disk unit 5 is carried out as follows. Initially, the data quantity in the buffer memory 2 is compared with the data quantity set in step ST57 (buffer data quantity decision step ST50). On the basis of the decision in step ST50, it is decided whether the speed area is to be switched or not (speed area switching decision step ST51). When it is decided in step ST51 that the speed area should be switched, the speed area is switched (speed area switching step ST52). When the switching of the speed area in step ST52 is completed, address and size of data to be written in the selected speed area are generated (write area allocation step ST53). When the allocation in step ST53 is completed, data is read from the buffer memory 2 according to the generated address and size, transferred to the disk unit 5, and recorded in the disk media (disk writing execution step ST54).

When the writing in step ST54 is completed, it is decided whether all of the data to be written are recorded in the disk media or not (recording end decision step ST55). When it is decided in step ST55 that the recording is not completed yet, the control returns to step ST50, and the recording operation is continued. On the other hand, when it is decided in step ST51 that switching of the speed area should not be performed, speed area switching step ST52 is not executed, i.e., step ST51 is followed by step ST53.

As described above, according to the first embodiment of the invention, even when the recording rate of data to be recorded exceeds the recording-rate performance of the low-speed area 12, since the high-speed area 11 whose recording-rate performance exceeds the recording rate exists, it is possible to record the data alternately in the low-speed area 12 and the high-speed area 11 while temporarily storing the data in the buffer memory 2. Therefore, the recording-rate performance of the disk unit 5 is balanced, whereby continuous video or audio data, which exceeds the recording-rate performance of the low-speed area in the disk unit 5, can be recorded in real time without being restricted by the recording-rate performance of the low-speed area.

[Embodiment 2]

Figure 5:
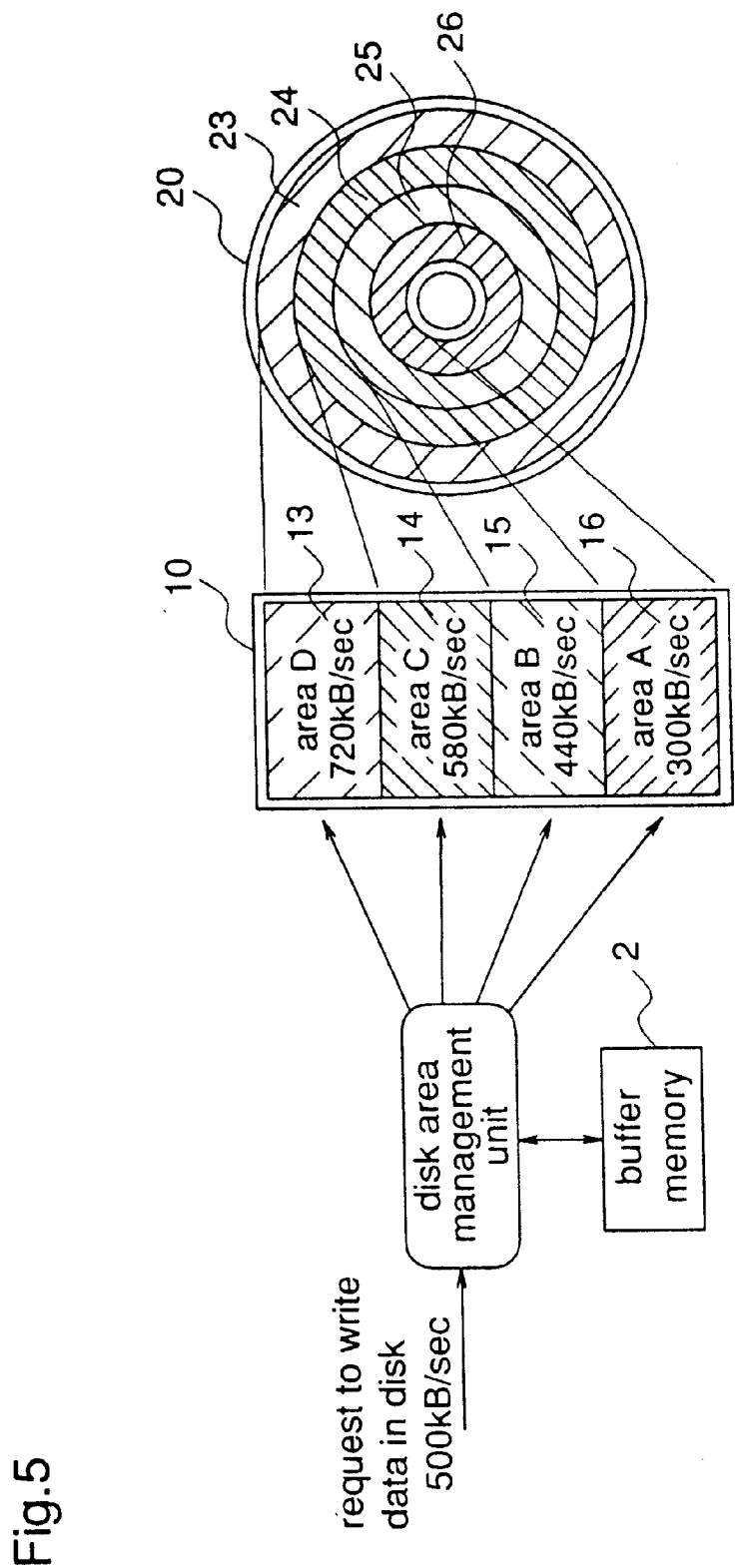
FIG. 5 is a block diagram illustrating a main structure of a recording device according to a second embodiment of the invention.

FIG. 5 is a block diagram illustrating a main part of a recording device according to a second embodiment of the invention. The recording device of this second embodiment is applied to a case where a disk medium is divided into four speed areas and managed. More specifically, as shown in FIG. 5, a data recording area 10 of a disk medium 20 is divided into four sub-areas, i.e., area D (13), area C (14), area B (15), and area A (16). The area D (13) corresponds to the outermost area 23 of the disk medium 20, the area A (16) corresponds to the innermost area 26, the area C (14) corresponds to the second-outer area 24, and the area B (15) corresponds to the second-inner area 25.

Figure 6:
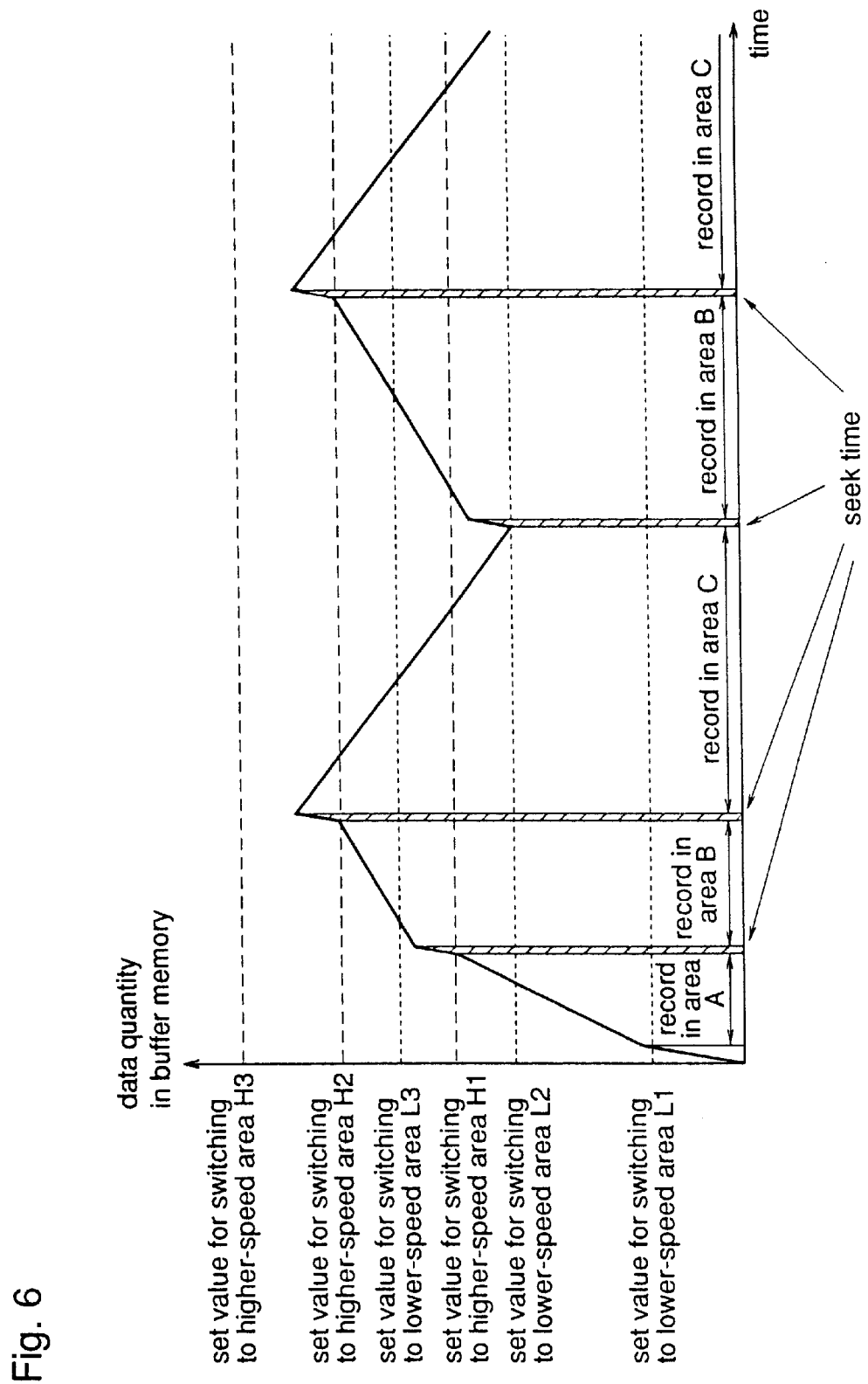
FIG. 6 is a diagram for explaining a recording operation of the recording device on the basis of the quantity of data in a buffer memory.

FIG. 6 is a diagram for explaining the recording operation of the recording device on the basis of the data quantity in the buffer memory. With reference to FIG. 6, the recording operation will be described hereinafter, using parameters shown in table 2.

TABLE 2

| recording rate | 500 kB/sec |
|---|---|
| recording-rate performance in area A | 300 kB/sec |

TABLE 2-continued

| | |
|---|---|
| recording-rate performance in area B | 440 kB/sec |
| recording-rate performance of area C | 580 kB/sec |
| recording-rate performance of area D | 720 kB/sec |

When a request-to-write is generated, storage of data in the buffer memory 2 is started. At this time, the data quantity in the buffer memory 2 increases by 500 kB/sec.

Next, writing of data in the area A is started. During the writing, the data quantity in the buffer memory 2 increases by 200 kB/sec which is a difference between the recording rate and the recording-rate performance of area A. When the data quantity in the buffer memory 2 reaches the first set value H1 for switching to a higher-speed area, the buffer management unit 1 requests the disk area management unit 3 to record data on a higher-speed area. Receiving the request from the buffer management unit 1, the disk area management unit 3 changes the mode to address generation for the area B. In the disk unit 5, seeking of the recording head from the area A to the area B is performed. Since the recording head is moving to a designated position (address) during the seeking operation, writing of data in the disk medium is not performed. Therefore, the data quantity in the buffer memory 2 increases at the recording rate, i.e., 500 kB/sec.

Next, writing of data in the area B is performed. During the writing, the data quantity in the buffer memory 2 increases by 60 kB/sec which is a difference between the recording rate and the recording-rate performance of the area B. When the data quantity in the buffer memory 2 reaches the second set value H2 for switching to a higher-speed area, the buffer management unit 1 requests the disk area management unit 3 to record data on a higher-speed area. Receiving the request of the buffer management unit 1, the disk area management unit 3 changes the mode to address generation for the area C. In the disk unit 5, seeking of the recording head from the area B to the area C is performed. Since the recording head is moving to a designated position (address) during the seeking operation, writing of data in the disk medium is not performed. Therefore, the data quantity in the buffer memory 2 increases at the recording rate, 500 kB/sec.

Next, writing of data in the area C is performed. During the writing, the data quantity in the buffer memory 2 decreases by 80 kB/sec which is a difference between the recording rate and the recording-rate performance of the area C. Since the data quantity in the buffer memory 2 starts to decrease, the data quantity does not reach the third set value H3 for switching the area C to a higher-speed area, i.e., the area D, so that recording of data in the area D is not performed. Therefore, the recording operation is not affected by the first set value L3 for switching to a lower-speed area, i.e., switching from the area D to the area C.

When the data quantity in the buffer memory 2 decreases to the second set value L2 for switching to a lower-speed area, the buffer management unit 1 requests the disk area management unit 3 to record data on a lower-speed area. Receiving the request from the buffer management unit 1, the disk area management unit 3 changes the mode to address generation for the area B. In the disk unit 5, seeking of the recording head from the area C to the area B is performed. Since the recording head is moving to a designated position (address) during the seeking operation, writing of data in the disk medium is not performed. Therefore, the data quantity in the buffer memory 2 increases at the recording rate, 500 kB/sec.

Next, writing of data in the area B is performed, and the data quantity in the buffer memory 2 starts to increase. Thereafter, until the request-to-write is completed, the above-mentioned procedure is repeated so that data is recorded alternately in the area B and the area C. However, when the available area for recording is used up in the area B or the area C, recording is switched to the area A or the area D, respectively.

Figure 7:
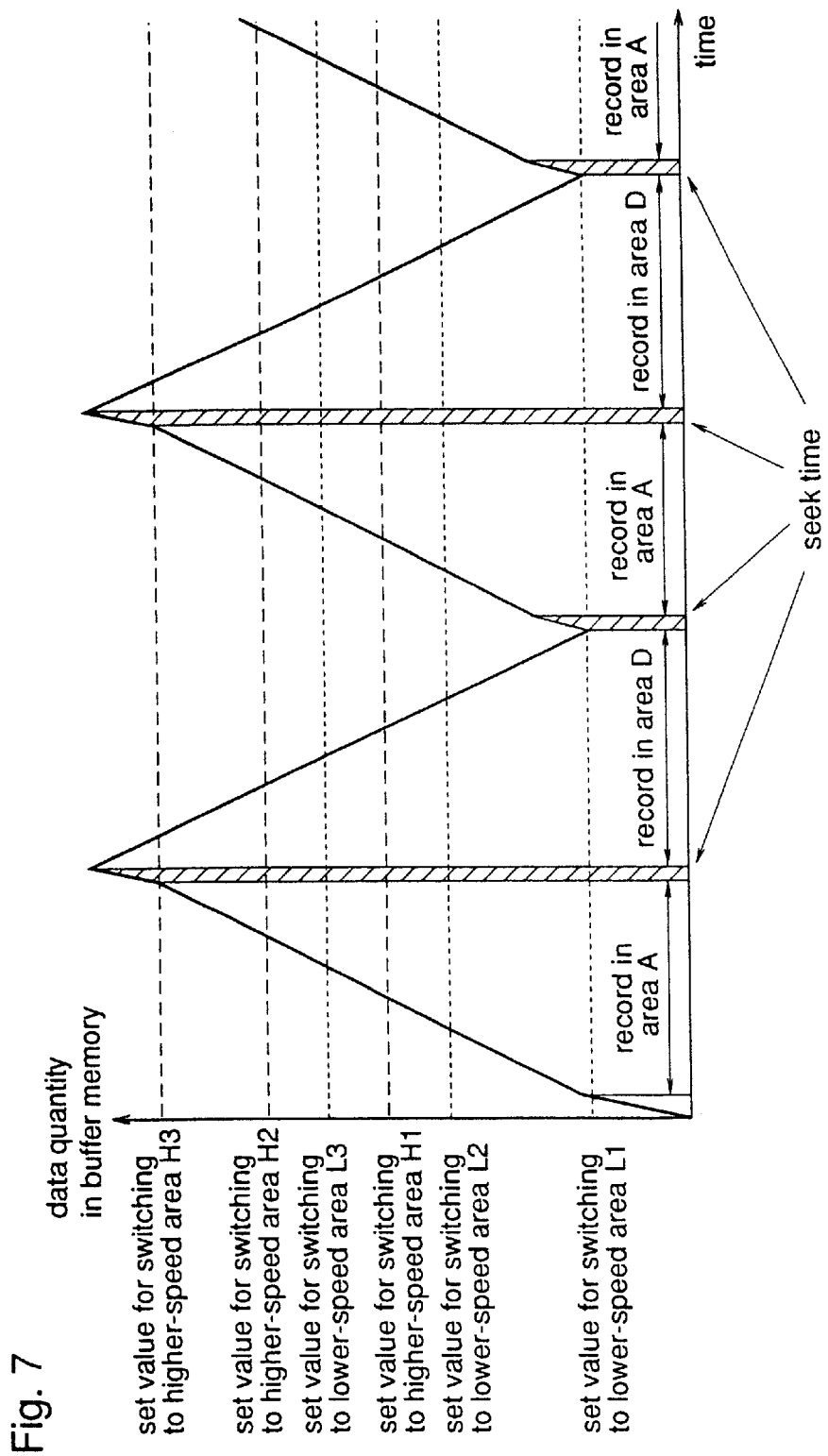
FIG. 7 is a diagram for explaining the recording operation on the basis of the quantity of data in the buffer memory, in a case where there is no available area for recording in areas B and C.

FIG. 7 is a diagram for explaining the recording operation in a case where the available space for recording is used up in the area B or the area C, on the basis of the data quantity in the buffer memory 2.

Hereinafter, the recording operation in the above case will be described with reference to FIG. 7, using the recording parameters of table 2.

When a request-to-write is generated, storage of data in the buffer memory 2 is started. At this time, the data quantity in the buffer memory 2 increases by 500 kB/sec.

Next, writing of data in the area A in the disk unit 5 is started. During the writing, the data quantity in the buffer memory 2 increases by 200 kB/sec which is a difference between the recording rate and the recording-rate performance of area A. When the data quantity in the buffer memory 2 reaches the first set value H1 for switching to a higher-speed area, the buffer management unit 1 requests the disk area management unit 3 to record data on a higher-speed area. However, the disk area management unit 3 cannot secure an available area in the area B. So, the unit 3 continues address generation for the area A. Likewise, when the data quantity in the buffer memory 2 reaches the second set value H2 for switching to a higher-speed area, the buffer management unit 1 requests the disk are management unit 3 to record data on a higher-speed area. However, since the disk area management unit 3 cannot secure an available area in the area C, it continues address generation for the area A.

When the data quantity in the buffer memory 2 reaches the third set value H3 for switching to a higher-speed area, the buffer management unit 1 requests the disk area management unit 3 to record data on a higher-speed area. Receiving the request from the buffer management unit 1, the disk area management unit 3 changes the mode to address generation for the area D. In the disk unit 5, seeking of the recording head from the area A to the area D is performed. Since the recording head is moving to a designated position (address) during the seeking operation, writing of data in the disk medium is not performed. Therefore, the data quantity in the buffer memory 2 increases at the recording rate, i.e., 500 kB/sec.

Next, writing of data in the area D is performed. During the writing, the data quantity in the buffer memory 2 decreases by 220 kB/sec which is a difference between the recording rate and the recording-rate performance of the area D. When the data quantity in the buffer memory 2 reaches the first set value L3 for switching to a lower-speed area, the buffer management unit 1 requests the disk area management unit 3 to record data on a lower-speed area. However, the disk area management unit 3 cannot secure an available area in the area C. So, the unit 3 continues address generation for the area D. Likewise, when the data quantity in the buffer memory 2 reaches the second set value L2 for switching to a lower-speed area, the buffer management unit 1 requests the disk area management unit 3 to record data on a lower-speed area. However, since the disk area management unit 3 cannot secure an available area in the area B, it continues address generation for the area D.

When the data quantity in the buffer memory 2 reaches the third set value L1 for switching to a lower-speed area, the buffer management unit 1 requests the disk area management unit 3 to record data on a lower-speed area. Receiving the request from the buffer management unit 1, the disk area management unit 3 changes the mode to address generation for the area A. In the disk unit 5, seeking of the recording head from the area D to the area A is performed. Since the recording head is moving to a designated position (address) during the seeking operation, writing of data in the disk medium is not performed. Therefore, the data quantity in the buffer memory 2 increases at the recording rate, i.e., 500 kB/sec.

Next, writing of data in the area A is performed, and the data quantity in the buffer memory 2 starts to increase. Thereafter, until the request-to-write is completed, the above-mentioned procedure is repeated so that data is recorded alternately in the area A and the area D.

The flow of controlling the above-mentioned recording operation is identical to that mentioned for the first embodiment and, therefore, does not require repeated description.

As described above, according to the second embodiment of the invention, since the recording operation is repeated so that data is recorded alternately in the area A and the area D until the request-to-write is completed, even though the areas B and C have no available areas for recording, the recording rate is balanced, whereby continuous video or audio data, which exceeds the recording-rate performance of the low-speed area in the disk unit 5, can be recorded in real time without being restricted by the recording-rate performance of the low-speed area.

Although the first and second embodiments are described for recording on two speed areas and recording on four speed areas, respectively, these embodiments can be easily modified for recording on N speed areas (N=integer).

[Embodiment 3]

Figure 8:
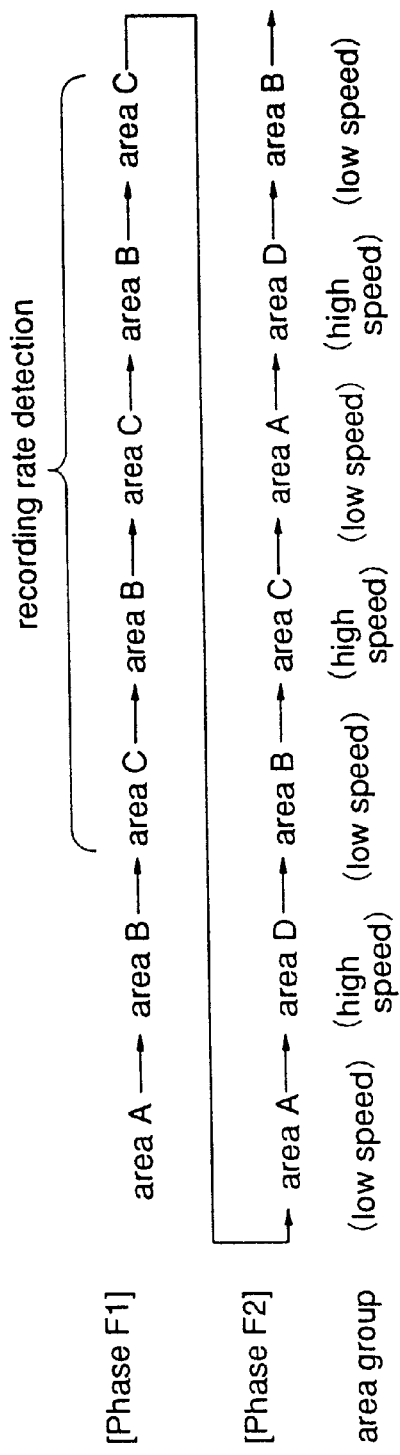
FIG. 8 is a diagram for explaining a speed-area allocating operation of a recording device according to a third embodiment of the invention.

FIG. 8 is a diagram for explaining speed-area allocating operation by a recording device according to a third embodiment of the invention. The fundamental structure of this recording device is identical to that of the second embodiment.

The recording operation already described with respect to FIGS. 6 and 7 has a drawback that an area whose recording-rate performance is near to the recording rate is used first. However, in the recording operation described with respect to FIG. 6, this drawback shows the fact that the recording rate is present between the recording-rate performance of the area B and the recording-rate performance of the area C. The third embodiment utilizes this characteristic.

To be specific, the recording device according to this third embodiment is characterized as follows. With the operation shown in FIG. 6 as phase F1, two speed-areas sandwiching the recording rate (areas B and C) are detected, and the respective speed areas A, B, C and D are divided into two groups, i.e., a low-speed area group and a high-speed area group, on the basis of the detected areas. That is, the areas A and B having recording-rate performances lower than the recording rate are included in the low-speed area group while the areas C and D having recording-rate performances higher than the recording rate are included in the high-speed area group. After the grouping is established, as phase F2, switching between the low-speed area group and the high-speed area group is performed so that the speed areas A, B, C and D included in the area groups are allocated in given order, according to a request to switch the speed area, generated by the buffer management unit 1.

More specifically, in phase F1, the recording rate is detected by detecting a repetition in selecting the speed area, and the above-mentioned grouping is performed. In phase F2, switching between the low-speed area group and the high-speed area group is performed. When the low-speed area group is selected, the speed areas in this group are selected in the order of area A, area B. When the high-speed area group is selected, the speed areas in this group are selected in the order of area D, area C. Hence, the speed areas are selected in the order of area A, area D, area B and area C.

As described above, according to the third embodiment of the invention, since the speed areas are repeatedly selected in the order of area A, area D, area B and area C, the above-mentioned problem that an area having a recording-rate performed near to the recording rate is used first is avoided. Therefore, the disk medium is used efficiently without concentrating on a specific speed area.

[Embodiment 4]

Figure 9:
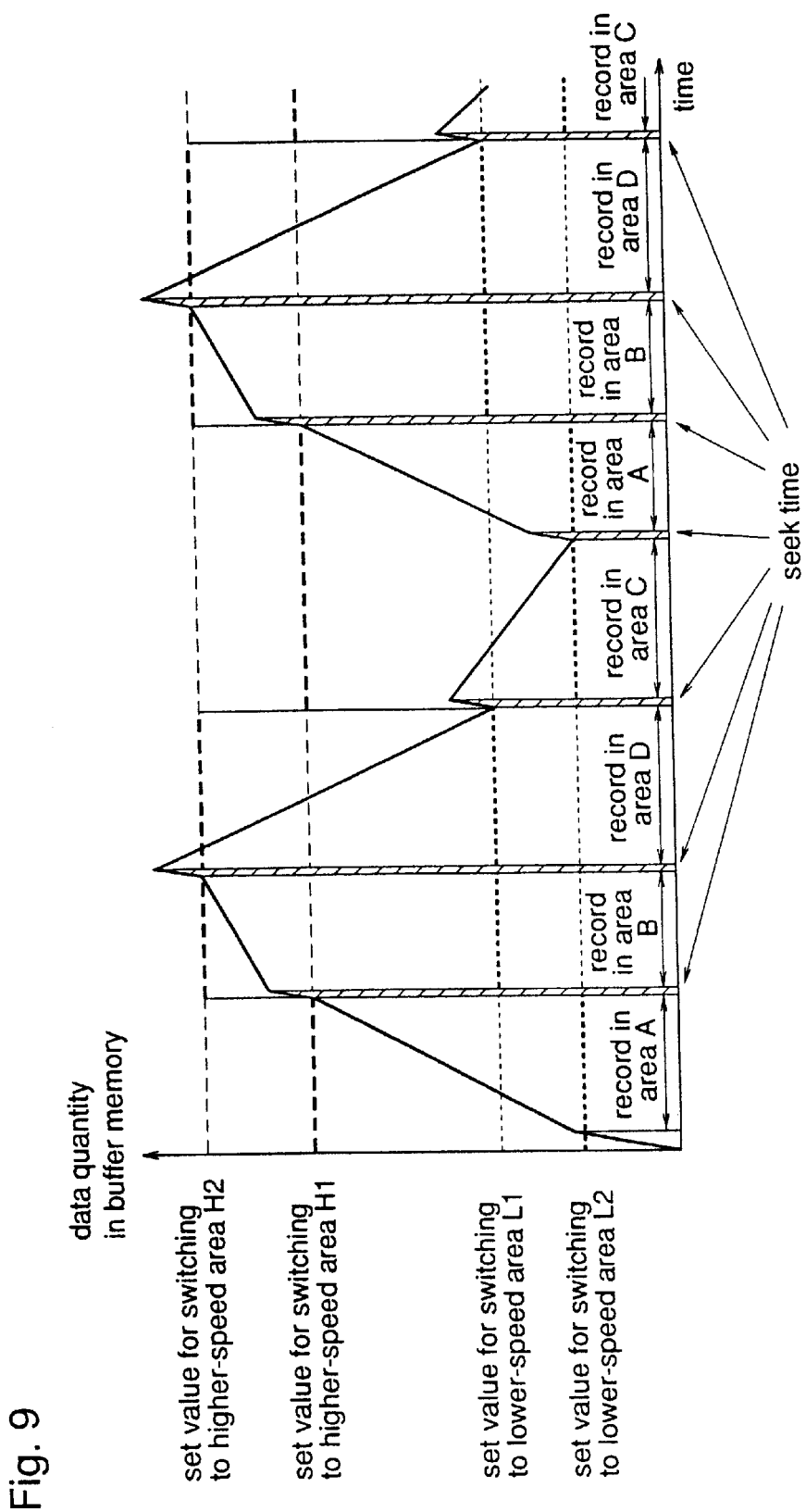
FIG. 9 is a diagram for explaining a recording operation of a recording device according to a fourth embodiment of the invention, on the basis of the quantity of data in a buffer memory.

FIG. 9 is a diagram for explaining a recording operation of a recording device according to a fourth embodiment of the invention, on the basis of the data quantity in the buffer memory. The fundamental structure of the recording device is identical to that described for the second embodiment. In this fourth embodiment, the recording device is improved so that recording is performed uniformly over the disk, without concentrating on a specific area.

Hereinafter, the recording operation will be described with reference to FIG. 9 and table 2.

When a request-to-write is generated, storage of data in the buffer memory 2 is started. At this time, the data quantity in the buffer memory 2 increases by 500 kB/sec.

Next, writing of data in the area A in the disk unit 5 is started. During the writing, the data quantity in the buffer memory 2 increases by 200 kB/sec which is a difference between the recording rate and the recording-rate performance of area A. When the data quantity in the buffer memory 2 reaches the first set value H1 for switching to a higher-speed area, the buffer management unit 1 requests the disk area management unit 3 to record data on a higher-speed area. In response to the request from the buffer management unit 1, the disk area management unit 3 changes the mode to address generation for the area B. In the disk unit 5, seeking of the recording head from the area A to the area B is performed. Since the recording head is moving to a designated position (address) during the seeking operation, writing of data in the disk medium is not performed. Therefore, the data quantity in the buffer memory 2 increases at the recording rate, i.e., 500 kB/sec.

Next, writing of data in the area B is performed. During the writing, the data quantity in the buffer memory 2 increases by 60 kB/sec which is a difference between the recording rate and the recording-rate performance of the area B. When the data quantity in the buffer memory 2 reaches the second set value H2 for switching to a higher-speed area, the buffer management unit 1 requests the disk area management unit 3 to record data on a higher-speed area. Receiving the request from the buffer management unit 1, the disk area management unit 3 changes the mode to address generation for the area D, not the area C. In the disk unit 5, seeking of the recording head from the area B to the area D is performed. Since the recording head is moving to a designated position (address) during the seeking operation, writing of data in the disk medium is not performed. Therefore, the data quantity in the buffer memory 2 increases at the recording rate, 500 kB/sec.

Next, writing of data in the area D is performed. During the writing, the data quantity in the buffer memory 2 decreases by 220 kB/sec which is a difference between the recording rate and the recording-rate performance of the area D. When the data quantity in the buffer memory 2 reaches the first set value L1 for switching to a lower-speed area, the buffer management unit 1 requests the disk area management unit 3 to record data on a lower-speed area. Receiving the request from the buffer management unit 1, the disk area management unit 3 changes the mode to address generation for the area C. In the disk unit 5, seeking of the recording head from the area D to the area C is performed. Since the recording head is moving to a designated position (address) during the seeking operation, writing of data in the disk medium is not performed. Therefore, the data quantity in the buffer memory 2 increases at the recording rate, 500 kB/sec.

Next, writing of data in the area C is performed. During the writing, the data quantity in the buffer memory 2 decreases by 80 kB/sec which is a difference between the recording rate and the recording-rate performance of the area C. When the data quantity in the buffer memory 2 reaches the second set value L2 for switching to a lower-speed area, the buffer management unit 1 requests the disk area management unit 3 to record data on a lower-speed area. Receiving the request from the buffer management unit 1, the disk area management unit 3 changes the mode to address generation for the area A, not the area B. In the disk unit 5, seeking of the recording head from the area C to the area A is performed. Since the recording head is moving to a designated position (address) during the seeking operation, writing of data in the disk medium is not performed. Therefore, the data quantity in the buffer memory 2 increases at the recording rate, 500 kB/sec.

Next, writing of data in the area A is performed, and the data quantity in the buffer memory 2 starts to increase. Thereafter, until the request-to-write is completed, the above-mentioned procedure is repeated so that data is recorded in the order of area A, area B, area C and area D.

According to the recording operation shown in FIG. 9, in the speed-area switching by which the sign (plus/minus) of the difference between the recording rate and the recording-rate performance changes, the speed area is switched to the highest-speed area or the lowest-speed area. On the other hand, in the speed-area switching by which the sign of the difference between the recording rate and the recording-rate performance does not change, the speed areas are successively switched. Therefore, the recording medium is efficiently used without concentrating on a specific area.

There are two purposes in this speed-area switching method.

First, in the switching method described with respect to FIG. 8 (areaA→areaD→areaB→areaC→ . . . ), switching between adjacent speed areas is 'areaB→areaC' only, so that the moving distance of the recording head with the speed-area switching is relatively long. On the other hand, according to the switching method described with respect to FIG. 9 (areaA→areaB→areaD→areaC→ . . . ), there are two times of switching between adjacent speed areas. Assuming that the switching between adjacent speed areas is 1, the speed-area switching distance per cycle is 3+2+1+2=8 in the former case while it is 1+2+1+2=6 in the latter case, that is, the seek time with the speed-area switching is reduced by the switching method according to this fourth embodiment.

Second, as shown in FIG. 9, in the low-speed area group, when the data quantity in the buffer memory 2 is small, the area A for which the increase rate of data in the buffer memory 2 is large is selected. When the data quantity in the buffer memory 2 is large, the area B for which the increase rate of data in the buffer memory 2 is small is selected. In the high-speed area group, when the data quantity in the buffer memory 2 is large, the area D for which the decrease rate of data in the buffer memory 2 is large is selected. When the data quantity in the buffer memory 2 is small, the area C for which the decrease rate of data in the buffer memory 2 is small is selected. Thereby, a margin in the capacity of the buffer memory 2 for avoiding overflow can be reduced, resulting in reliable control.

A description is now given of preferable methods of controlling the recording operation described above.

One method is to employ the above-mentioned grouping of speed areas. The grouping of speed areas in phase F1 is performed as mentioned above. In phase F2, the buffer management unit 1 generates a request to switch the speed area within the selected area group, in addition to a request to switch the area group. That is, in FIG. 9, the set value H2 for switching to a higher-speed area is a set value for generating a request to switch the area group from the lower-speed area group to the higher-speed area group, and the set value L2 for switching to a lower-speed area is a set value for generating a request to switch the area group from the higher-speed area group to the lower-speed area group. Further, the set value H1 for switching to a higher-speed area is a set value for generating a request to switch the area A to the area B in the lower-speed area group when the lower-speed area group is selected, and the set value L1 for switching to a lower-speed area is a set value for generating a request to switch the area D to the area C in the higher-speed area group when the higher-speed area group is selected.

Another method employs a recording rate setting/detecting means for setting or detecting a recording rate corresponding to the quantity of data input to the buffer memory 2 in unit time, and a recording-rate performance entering means for entering the recording-rate performances of the respective speed areas. In this method, when switching the speed area, a speed area is selected after comparing the recording-rate performance of a target speed area with the recording rate.

The recording rate setting/detecting means is implemented by calculating the quantity of input data per unit time in the buffer management unit 1, or estimating the recording rate from a change in the data quantity per unit time in the buffer memory 2. Or, the recording rate may be a variable set by a program or a unit that generates a request to write data in the disk medium. The recording-rate performance entering means is implemented by a table or a structure that holds the recording-rate performances of the respective speed areas.

A description is given of speed-area selection using the latter method.

With reference to FIG. 9, when data is recorded in the first area A, a difference between its recording-rate performance and the recording rate is 200 kB/sec. When the area A is switched to another speed area, the first candidate is the area B, and a difference between its recording-rate performance and the recording rate is 60 kB/sec. Since the sign (plus/minus) does not change with respect to 200 kB/sec of the area A, the area B is selected. When the area B is switched to another speed area, the first candidate is the area C, and a difference between its recording-rate performance and the recording rate is −80 kB/sec. Since the sign changes with respect to 60 kB/sec of the area B, the area D is given as the second candidate, and a difference between its recording-rate performance and the recording rate is evaluated. Since this difference is −220 kB/sec, that is, larger than −80 kB/sec of the area C, the area D is selected. When the area D is switched to another speed area, the first candidate is the area C, and a difference between its recording-rate performance and the recording rate is −80 kB/sec. Since the sign does not change with respect to −220 kB/sec of the area D, the area C is selected. When the area C is switched to another speed area, the first candidate is the area B, and a difference between its recording-rate performance and the recording rate is 60 kB/sec. Since the sign changes with respect to −80 kB/sec of the area C, the area A is given as the second candidate, and a difference between its recording-rate performance and the recording rate is evaluated. Since this difference is 200 kB/sec, that is, larger than 60 kB/sec of the area B, the area A is selected. Thereafter, the speed areas are successively selected in the order of area A, area B, area D and area C.

Figure 10:
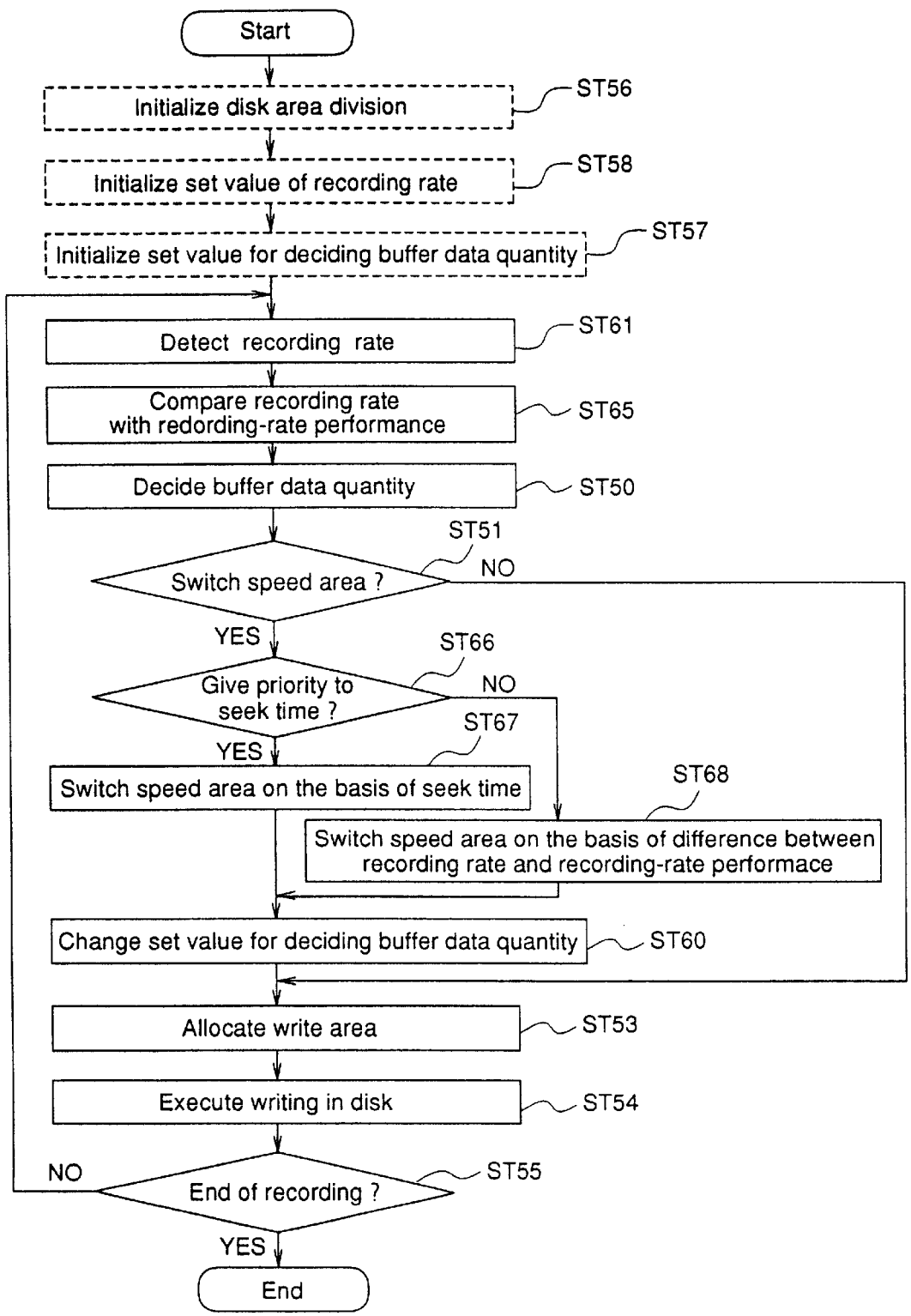
FIG. 10 is a flowchart showing how to control the recording operation according to the fourth embodiment.

FIG. 10 is a flowchart showing how to control the recording operation using the above-mentioned method (latter method). In FIG. 10, the same step numbers as those shown in FIG. 4 designate the same or corresponding steps.

With reference to FIG. 10, before starting the recording operation, the disk area is divided into plural sub-areas (speed areas) in step ST56. Then, a data quantity per unit time of request-to-write is set (recording rate set value initialization step ST58), followed by step ST57 for initializing a set value for deciding buffer data quantity.

The operation of writing data in the disk unit 5 is carried out as follows. Initially, a data quantity per unit time of the data input to the buffer memory 2 is detected (recording rate detecting step ST61). Next, the recording rate detected in step ST61 is compared with the recording-rate performance of a speed area being a target of speed-area switching (recording rate and recording-rate performance comparing step ST65). When the comparison in step ST65 is completed, buffer data quantity decision step ST50 is executed. Thereafter, on the basis of the results obtained in steps ST65 and ST50, speed-area switching decision step ST51 is executed. When the decision in step ST51 is to switch the speed area, it is decided on the basis of the result in step ST65 whether a target speed area is selected with a priority on the shortness of the seek time or on the largeness of difference between the recording rate and the recording-rate performance (speed-area selecting method decision step ST66). When the decision in step ST66 is that a target speed area should be selected with a priority on the seek time, a speed area is selected so that the seek time is reduced (speed-area switching step ST67). On the other hand, when the decision in step ST66 is that a target speed area should be selected with a priority on the difference between the recording rate and the recording-rate performance, a speed area is selected so that the difference between the recording-rate performance and the recording rate is increased (speed-area switching step ST68). Then, according to the decision in speed-area switching decision step ST51 or according to the comparison between the recording rate and the recording-rate performance in step ST65, the set value for deciding the data quantity in the buffer memory 2, which is set in step ST57, is changed (buffer data quantity deciding set value change step ST60). Thereafter, write area allocation step ST53, disk writing execution step ST54, and recording end decision step ST51 are executed in this order. When it is decided in step ST51 that the speed area should not be changed, above-mentioned steps ST66, ST67, ST68 and ST60 are not executed, and step ST51 is followed by step ST53.

As described above, according to the fourth embodiment of the invention, in addition to a request to switch the speed area group, a request to switch the speed area within the speed area group is generated. Thereby, the speed-area switching time is dispersed, and a variation (quantity) of data in the buffer memory 2 can be set according to the data quantity in the buffer memory 2. Hence, unwanted overflow of the buffer memory 2 is avoided, and the disk medium is used efficiently.

Further, since a change in the requested recording rate is detected and a set value for generating a request to switch the speed area is adjusted, the speed-area switching is optimized with respect to the recording rate. As a result, efficient use of the disk medium is secured.

[Embodiment 5]

Figure 11:
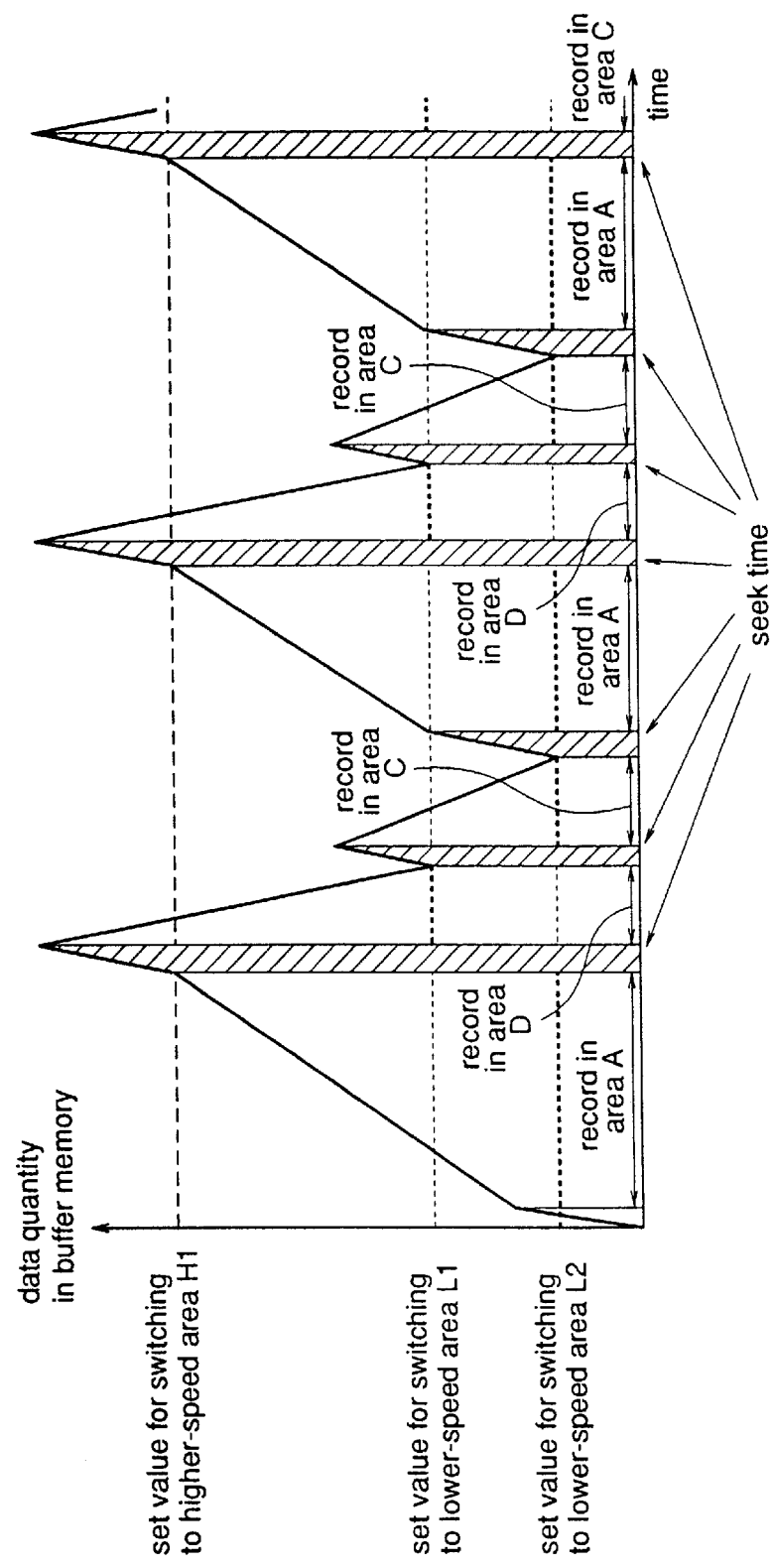
FIG. 11 is a diagram for explaining a recording operation of a recording device according to a fifth embodiment of the invention, on the basis of the quantity of data in a buffer memory.

FIG. 11 is a diagram for explaining a recording operation of a recording device according to a fifth embodiment of the invention, on the basis of the data quantity in the buffer memory 2. The main structure of this recording device is identical to that described for the second embodiment. Table 3 shows parameters used for explaining the recording operation.

TABLE 3

| | |
|---|---|
| recording rate | 400 kB/sec |
| recording-rate performance of area A | 300 kB/sec |
| recording-rate performance of area B | 440 kB/sec |
| recording-rate performance of area C | 580 kB/sec |
| recording-rate performance of area D | 720 kB/sec |

In this fifth embodiment, as shown in table 3, it is assumed that the recording-rate performances of three speed areas B, C, and D exceed the recording rate.

The recording operation will be described in detail using FIG. 11 and table 3.

When a request-to-write is generated, storage of data in the buffer memory 2 is started. At this time, the data quantity in the buffer memory 2 increases by 400 kB/sec.

Next, writing of data in the area A is started. During the writing, the data quantity in the buffer memory 2 increases by 100 kB/sec which is a difference between the recording rate and the recording-rate performance of area A. When the data quantity in the buffer memory 2 reaches the first set value H1 for switching to a higher-speed area, the buffer management unit 1 requests the disk area management unit 3 to record data in a higher-speed area. In response to the request from the buffer management unit 1, the disk area management unit 3 changes the mode to address generation for the area D, not the area B. In the disk unit 5, seeking of the recording head from the area A to the area D is performed. Since the recording head is moving to a designated position (address) during the seeking operation, writing of data in the disk medium is not performed. Therefore, the data quantity in the buffer memory 2 increases at the recording rate, i.e., 400 kB/sec.

Next, writing of data in the area D is performed. During the writing, the data quantity in the buffer memory 2 decreases by 320 kB/sec which is a difference between the recording rate and the recording-rate performance of the area D. When the data quantity in the buffer memory 2 reaches the first set value L1 for switching to a lower-speed area, the buffer management unit 1 requests the disk area management unit 3 to record data in a lower-speed area. Receiving the request from the buffer management unit 1, the disk area management unit 3 changes the mode to address generation for the area C. In the disk unit 5, seeking of the recording head from the area D to the area C is performed. Since the recording head is moving to a designated position (address) during the seeking operation, writing of data in the disk medium is not performed. Therefore, the data quantity in the buffer memory 2 increases at the recording rate, 400 kB/sec.

Next, writing of data in the area C is performed. During the writing, the data quantity in the buffer memory 2 decreases by 180 kB/sec which is a difference between the recording rate and the recording-rate performance of the area C. When the data quantity in the buffer memory 2 decreases to the second set value L2 for switching to a lower-speed area, the buffer management unit 1 request the disk area management unit 3 to record data in a lower-speed area. Receiving the request from the buffer management unit 1, the disk area management unit 3 changes the mode to address generation for the area A, not the area B. In the disk unit 5, seeking of the recording head from the area C to the area A is performed. Since the recording head is moving to a designated position (address) during the seeking operation, writing of data in the disk medium is not performed. Therefore, the data quantity in the buffer memory 2 increases at the recording rate, 400 kB/sec.

Next, writing of data in the area A is performed, and the data quantity in the buffer memory 2 starts to increase. Thereafter, until the request-to-write is completed, the above-mentioned procedure is repeated so that data is alternately recorded in the area A and the area D.

Since the recording-rate performance of the area B is very close to the recording rate, a variation in the data quantity in the buffer memory 2 is very small. In ideal operation, as shown in FIG. 11, the data quantity in the buffer memory 2 changes linearly. In the actual operation, however, a fluctuation may occur in the change due to the request-to-write or data transfer to the disk unit 5. So, to decide switching of the speed area by only the data quantity in the buffer memory 2 has a risk of frequent or infrequent switching. In such a case, the method described with respect to FIG. 11 is effective, in which, when a difference between the recording-rate performance of a speed area and the recording rate is lower than a prescribed value, the speed area is not selected.

As described above, according to a fifth embodiment of the invention, when a difference between the recording-rate performance of a speed area and the recording rate is lower than a prescribed value, the speed area is not selected. Therefore, even when switching of the speed area is decided by only the data quantity in the buffer memory 2 regardless of a fluctuation in change of the data quantity in the buffer memory 2, switching is prevented from being frequent or infrequent.

[Embodiment 6]

Figure 12:
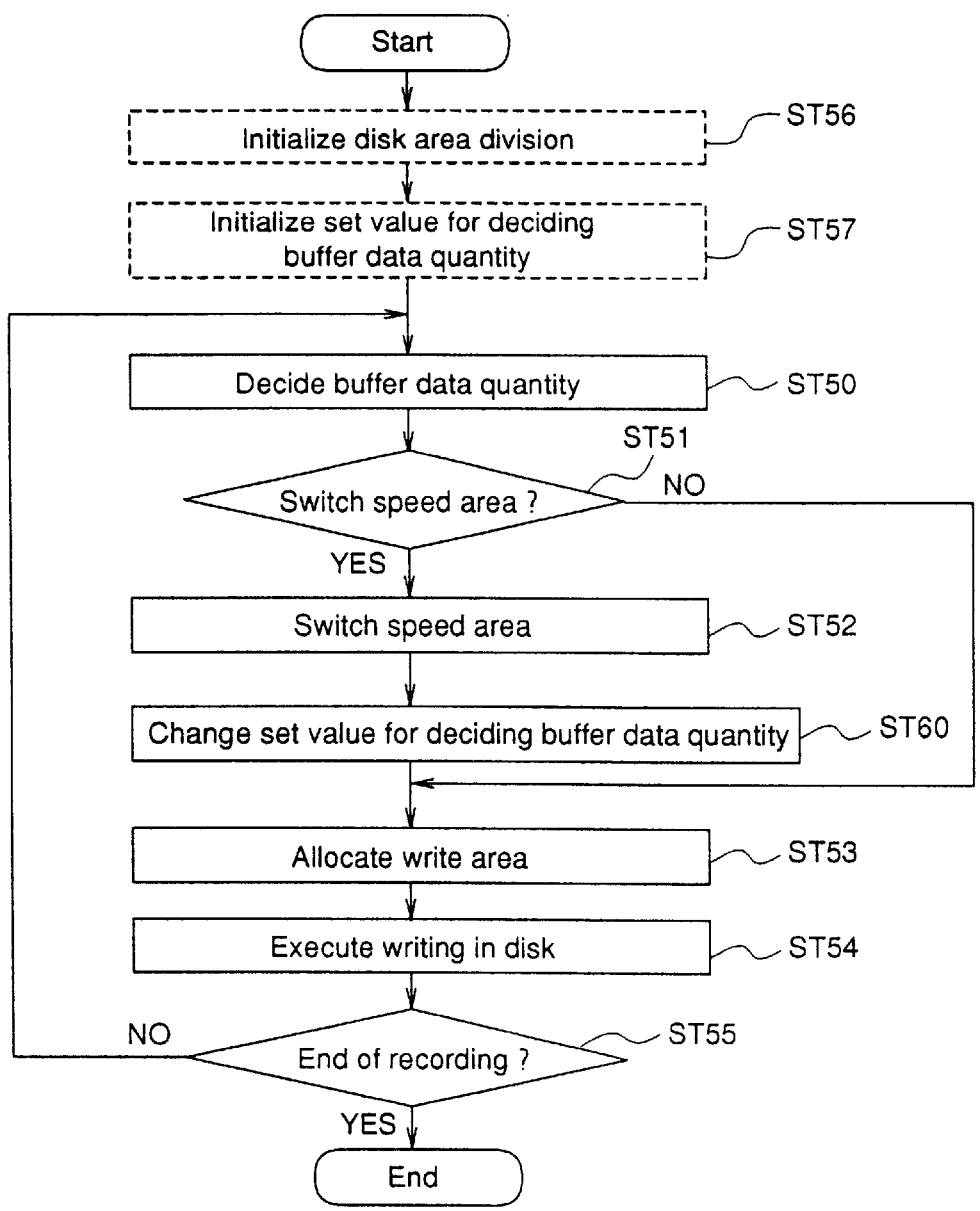
FIG. 12 is a flowchart showing how to control a recording operation of a recording device according to a sixth embodiment of the invention.

FIG. 12 is a flowchart showing how to control a recording operation of a recording device according to a sixth embodiment of the invention. The main structure of the recording device is identical to that described for the second embodiment.

In this sixth embodiment, the speed area selecting method described for the flowchart of FIG. 4 is improved. More specifically, this sixth embodiment is characterized by "buffer data quantity deciding set value change step ST60" in which a set value that is compared with the data quantity in the buffer memory 2 to decide switching of the speed area is changed to a value for the next switching, with execution of speed-area switching step ST52.

The operation in step ST60 in the flowchart of FIG. 12 will be described using FIG. 9. The buffer management unit 1 includes a first register for storing a set value for generating a request to switch to a higher-speed area and a second register for storing a set value for generating a request to switch to a lower-speed area.

With reference to FIG. 9, before the operation is started, the first register contains a set value for switching the area A to the area B, which value corresponds to the set value H1 for switching to a higher-speed area shown in FIG. 9, while the second register contains a set value for switching the area C to the area A, which corresponds to the set value L2 for switching to a lower-speed area.

When recording in the area A is performed and it is detected that the data quantity in the buffer memory 2 reaches the value of the first register, switching from the area A to the area B is executed and, simultaneously, the set value of the first register is updated to a set value for switching from the area B to the area D, which corresponds to the set value H2 for switching to a higher-speed area. At the same time, the value of the second register is updated to a set value for switching the area D to the area C, which corresponds to the set value L1 for switching to a lower-speed area.

When it is detected that the data quantity in the buffer memory 2 reaches the value of the first register, the area B is switched to the area D, and the values of the first and second registers are not updated.

Then, the data quantity in the buffer memory 2 turns to decrease and, when it is detected that the data quantity reaches the value of the second register, switching from the area D to the area C is performed and, simultaneously, the value of the second register is updated to a set value for switching the area C to the area A, which corresponds to the set value L2 for switching to a lower-speed area. At the same time, the value of the first register is updated to a set value for switching the area A to the area B, which corresponds to the set value H1 for switching to a higher-speed value.

When it is detected that the data quantity in the buffer memory 2 reaches the set value of the second register, the area C is switched to the area A without updating the values of the first and second registers. Thereafter, the above-mentioned operation is repeated. In FIG. 9, the set values to be stored in the registers are shown by thick dashed lines.

As described above, according to the sixth embodiment of the invention, regardless of the number of speed areas into which the disk area is divided, only rewriting of a set value required for comparison is needed. Therefore, in speed-area switching decision step ST51, only the value set in step ST60 is used for the decision. Consequently, the processing is simplified.

Further, since the set value registers are updated adaptively to switching of the speed area, the comparison of the data quantity in the buffer memory 2 is facilitated.

Although in the first to sixth embodiments division and management of speed areas are performed for a predetermined recording rate, there is a case where a recording rate is changed according to the degree of difficulty in compressing data. This method is called 'variable bit rate' and adopted in DVD.

In seventh to eleventh embodiments mentioned hereinafter, recording devices having extended functions to cope with the variable bit rate are proposed.

[Embodiment 7]

Figure 13:
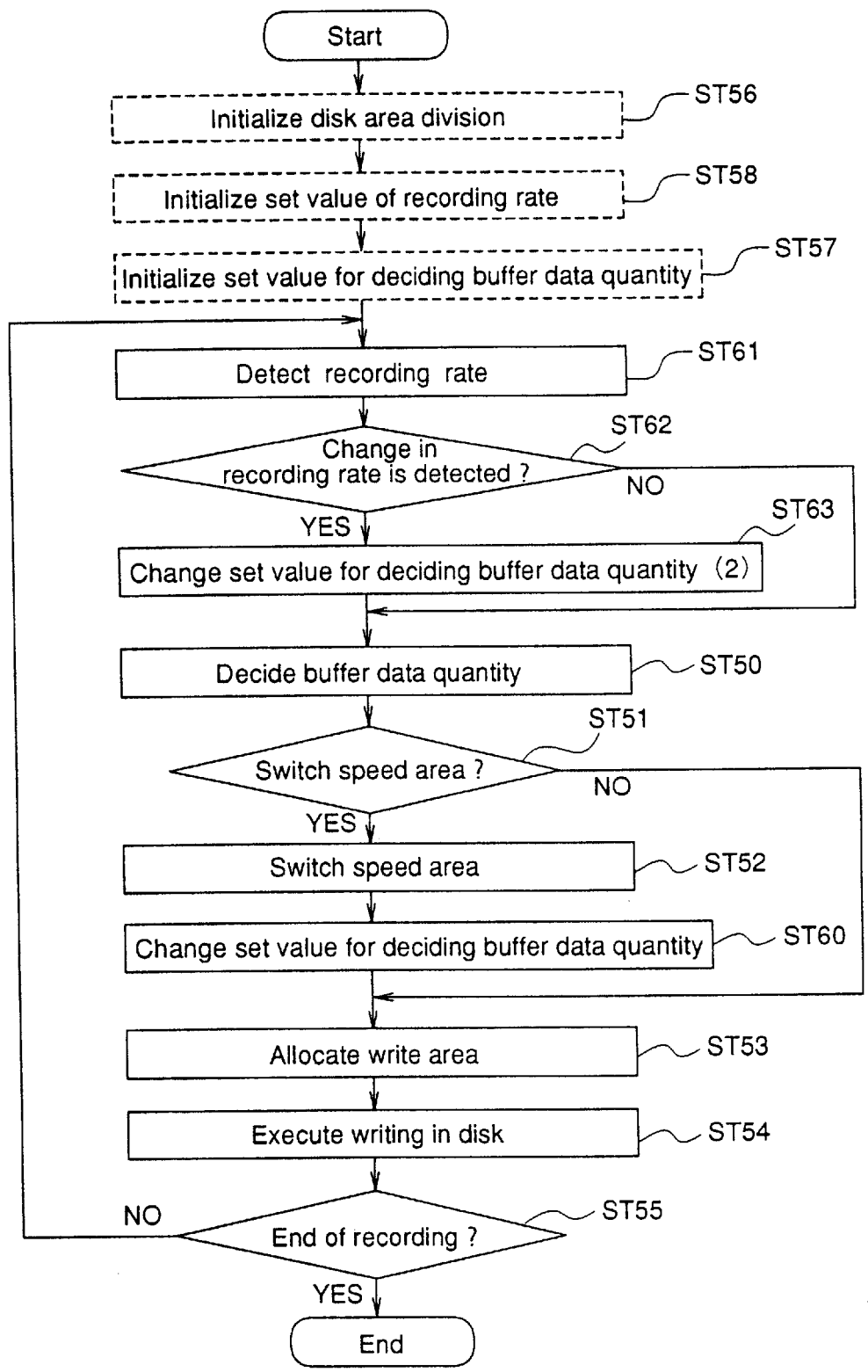
FIG. 13 is a flowchart showing how to control a recording operation of a recording device according to a seventh embodiment of the invention.

FIG. 13 is a flowchart showing how to control a recording operation of a recording device according to a seventh embodiment of the invention. The main structure of the recording device is identical to that described for the second embodiment.

With reference to FIG. 13, the recording device according to this seventh embodiment is characterized by the following steps. The initialization process includes "recording rate set value initialization step ST58" for setting a data quantity per unit time of a request-to-write. Further, the data writing process includes "recording rate detection step ST61" for detecting a data quantity per unit time of data input to the buffer memory 2, "recording rate change detection step ST62" for detecting a change in the recording rate, and "buffer data quantity deciding set value change step ST63" in which, when the recording rate is changed, the buffer data quantity deciding set value, which is compared with the data quantity in the buffer memory 2 to decide switching of the speed area, is changed according to the change of the recording rate, separated from "buffer data quantity deciding set value change step ST60. Further, step ST63 is followed by steps from ST50 on as shown in FIG. 12.

Figure 14:
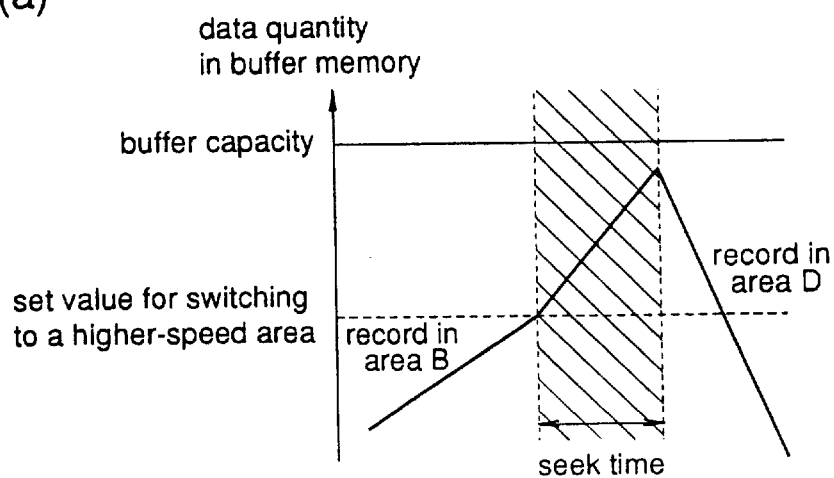
FIG. 14($a$) is a diagram for explaining an example of speed-area setting, 14($b$) is a diagram for explaining a speed-area division/management changing operation according to a change in recording rate, and 14($c$) is a diagram for explaining the relationship between the quantity of data in a sequence assigned to the speed area and a set value for area-switching.
Figure 14:
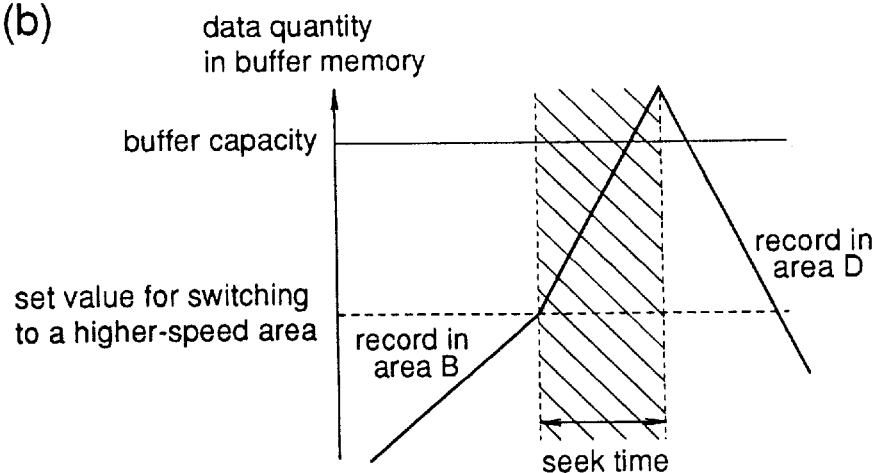
Figure 14:
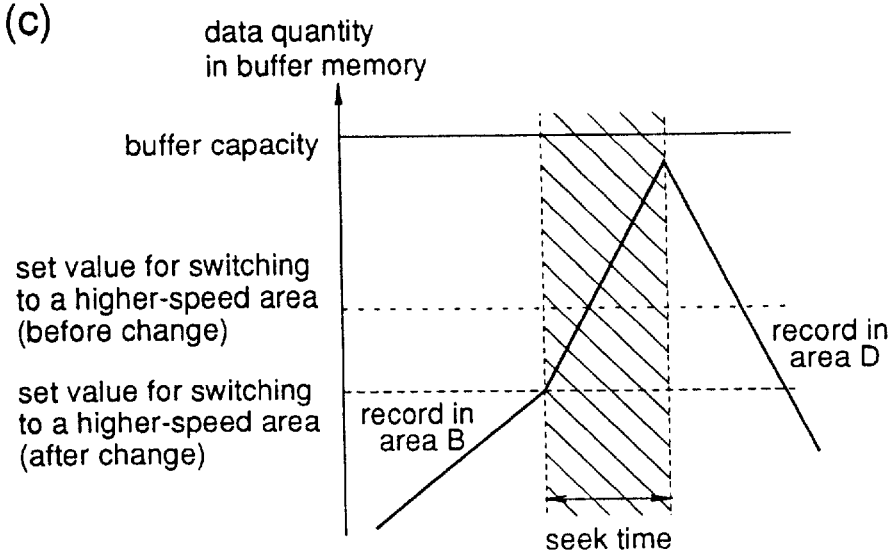

FIGS. 14(a)–14(c) are diagrams for explaining the effectiveness of the control operation shown in FIG. 13. Switching between the speed areas is performed according to FIG. 9.

As shown in FIG. 14(a), assuming that the recording rate is 450 kB/sec and the seek time from the area B to the area C is 200 m/sec, the data quantity in the buffer memory 2 increases by 90 kB in the seek time. So, when a difference between the capacity of the buffer memory 2 and the set value for switching to a higher-speed area is set to 100 kB, overflow of the buffer memory 2 is avoided. However, if the recording rate changes at 550 kB/sec as it is set, the data quantity in the buffer memory 2 increases by 110 kB in the seek time, resulting in overflow of the buffer memory 2.

To avoid the overflow, as shown in FIG. 14(c), the change in the recording rate from 450 kB/sec to 550 kB/sec is detected, and the set value is changed so that the difference between the recording rate and the set value for switching becomes 120 kB/sec.

As described above, according to the seventh embodiment of the invention, since an optimum value for deciding the buffer data quantity can be set for the recording rate, the use frequencies of the respective speed areas are controlled, resulting in efficient use of the disk medium.

[Embodiment 8]

Figure 15:
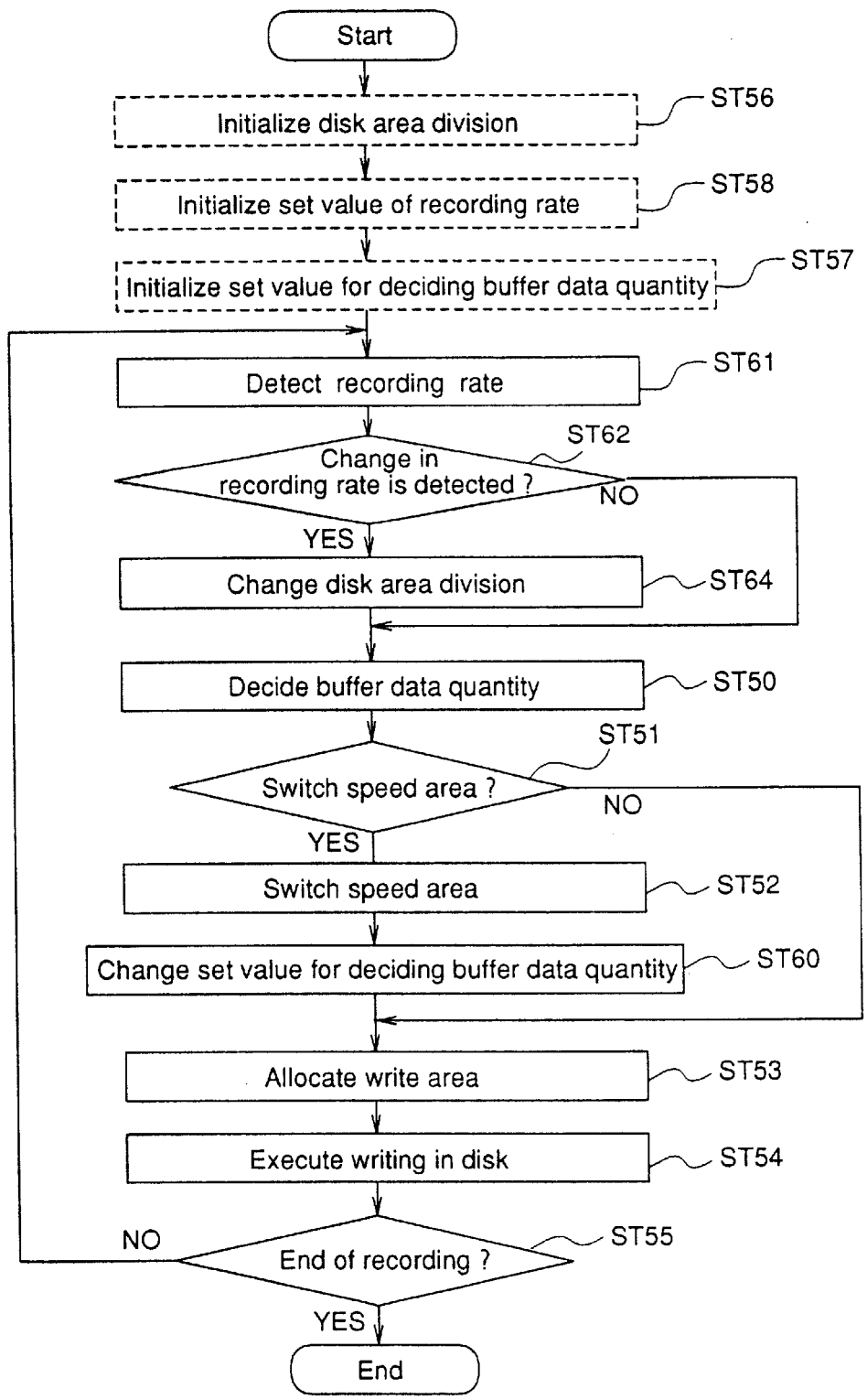
FIG. 15 is a flowchart showing how to control a recording operation of a recording device according to an eighth embodiment of the invention.

FIG. 15 is a flowchart showing how to control a recording operation of a recording device according to an eighth embodiment of the invention. In this eighth embodiment, the recording device according to the seventh embodiment shown in FIG. 13 is improved for efficient use of a disk medium.

Figure 16:
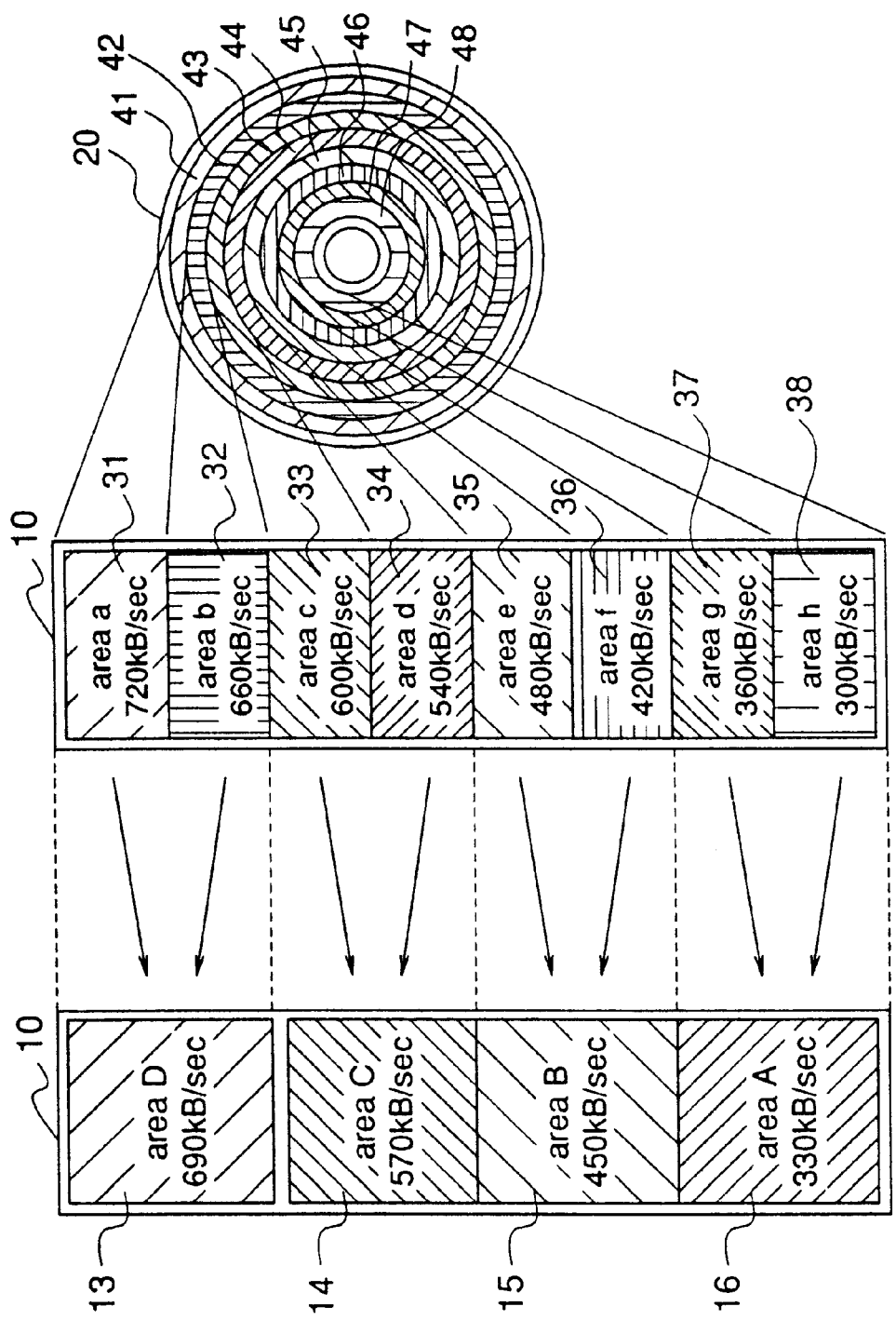
FIG. 16 is a diagram for explaining the effectiveness of the control operation shown in FIG. 15.
Figure 17:
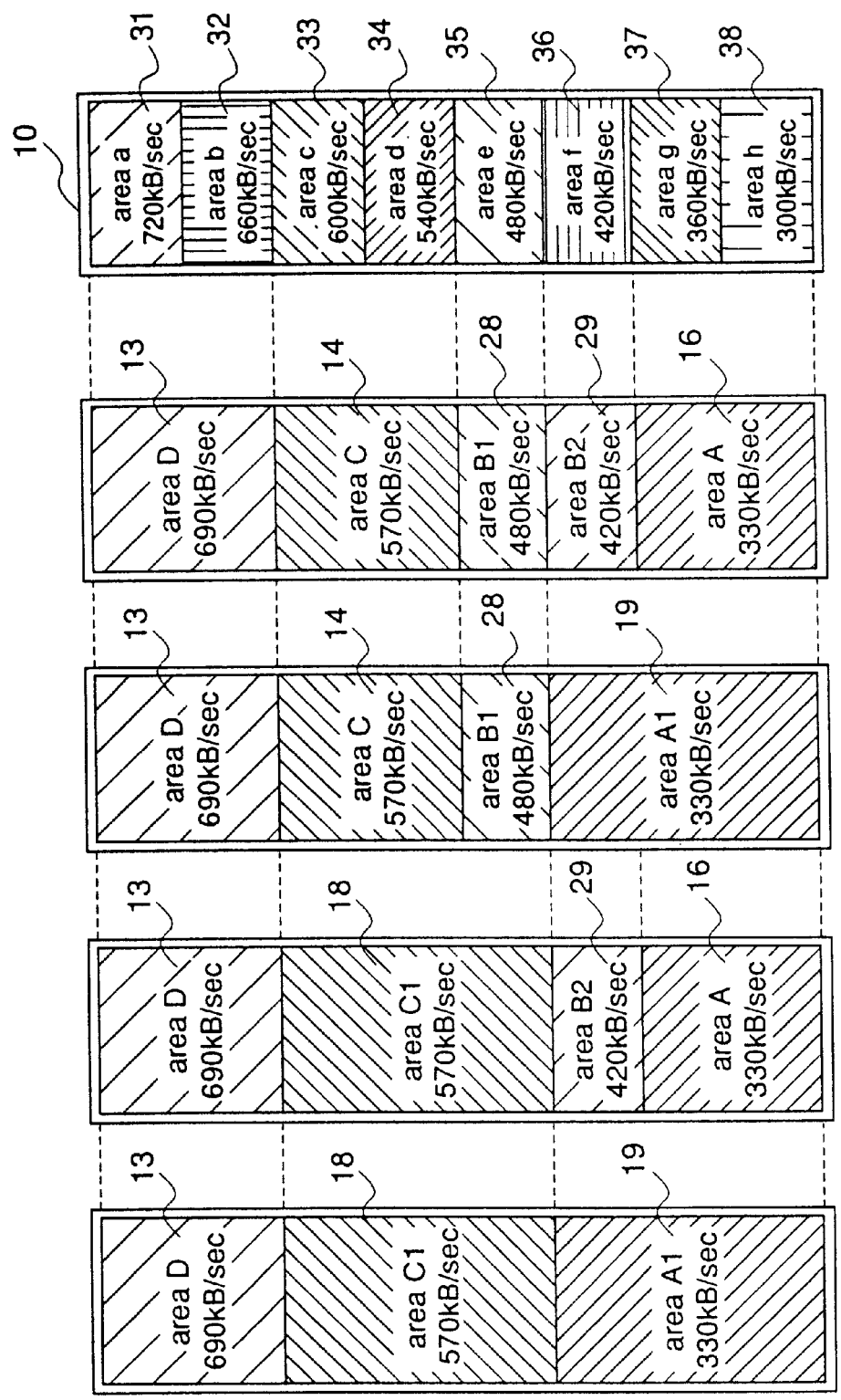
FIG. 17 is a diagram showing a state after changing the area-division method.

The flowchart of FIG. 15 is different from the flowchart of FIG. 13 in the following point. In the flowchart shown in FIG. 13, when a change in the recording rate is detected in step ST62, the set value which is compared with the data quantity in the buffer memory 2 to decide switching of the speed area is changed according to the change in the recording rate in step ST63. On the other hand, the flowchart of FIG. 15 includes, in place of step ST63, "disk area division change step ST64" for reexamining the method of dividing the disk into speed areas according to the change in the recording rate. FIGS. 16 and 17 are diagrams for explaining the effectiveness of the control operation shown in FIG. 15.

With reference to FIG. 16, a disk type recording medium 20 has eight areas 41, 42, 43, 44, 45, 46, 47 and 48 from its outer circumference to its inner circumference, and these areas correspond to areas a(31), b(32), c(33), d(34), e(35), f(36), g(37) and h(38) on a data recording area 10, respectively.

Assuming that the recording-rate performances of the respective areas range from 720 kB/sec to 300 kB/sec as shown in FIG. 16, when the recording rate is 500 kB/sec, the areas a and b are regarded as an area D, and an intermediate value of the recording-rate performances of the areas a and b, i.e., 690 kB/sec, is given as a recording-rate performance of the area D. Likewise, the areas c and d are regarded as an area C, the areas e and f are as an area B, and the areas g and h are as an area A. In this case, each area is increased, whereby the control operation is simplified.

However, if the recording rate changes to 450 kB/sec, in the area B composed of the area f of 420 kB/sec and the area e of 480 kB/sec, a portion where the data quantity in the buffer memory 2 increases and a portion where the data quantity decreases are produced, leading to an inconvenience in control. So, the division method must be changed.

With reference to FIG. 17, the area B is divided into an area B1 and an area B2. The area B1 may be combined with the area C to make an area C1, or the area B2 may be combined with the area A to make an area A1. In this way, the area-division method is changed to continue the control for balancing the recording rate.

As described above, according to this eighth embodiment of the invention, since the capacity or the recording-rate performance of each speed area can be changed, the efficiency in use of the disk medium is further improved.

Further, since a change in the recording rate requested is detected and the method of dividing the recording medium into speed areas is changed according to the change in the recording rate, switching of the speed-area is optimized for the recording rate, whereby the effective use of the recording medium is secured.

Further, (second) buffer data quantity deciding set value change step ST63 shown in FIG. 13 may be combined with the disk area division change step ST64 shown in FIG. 15.

In any of the aforementioned embodiments, described is a recording device employing a disk unit that uses a disk medium in which the recordable data quantity per unit time varies area to area, and a recording area of the medium is divided into plural speed areas on the basis of their recording-rate performances. When data is recorded on the medium, a higher-speed area and a lower-speed area are alternately allocated to average the recording rate and improve the efficiency in use of the disk medium. However, for the recording operation of this recording device, a buffer memory of several megabytes (MB) is indispensable.

However, a pre-read cache of several tens to several hundreds of kilobytes (kB) is generally used for reproduction, so that the continuity of data at reproduction must be considered to secure real-time reading of data at reproduction. The easiest method for improving the continuity of data at reproduction is to control the quantity of data in a sequence assigned to each speed area at every switching between speed areas.

In ninth to eleventh embodiments of the invention, recording devices capable of controlling the data quantity as mentioned above are proposed.

[Embodiment 9]

Figure 19:
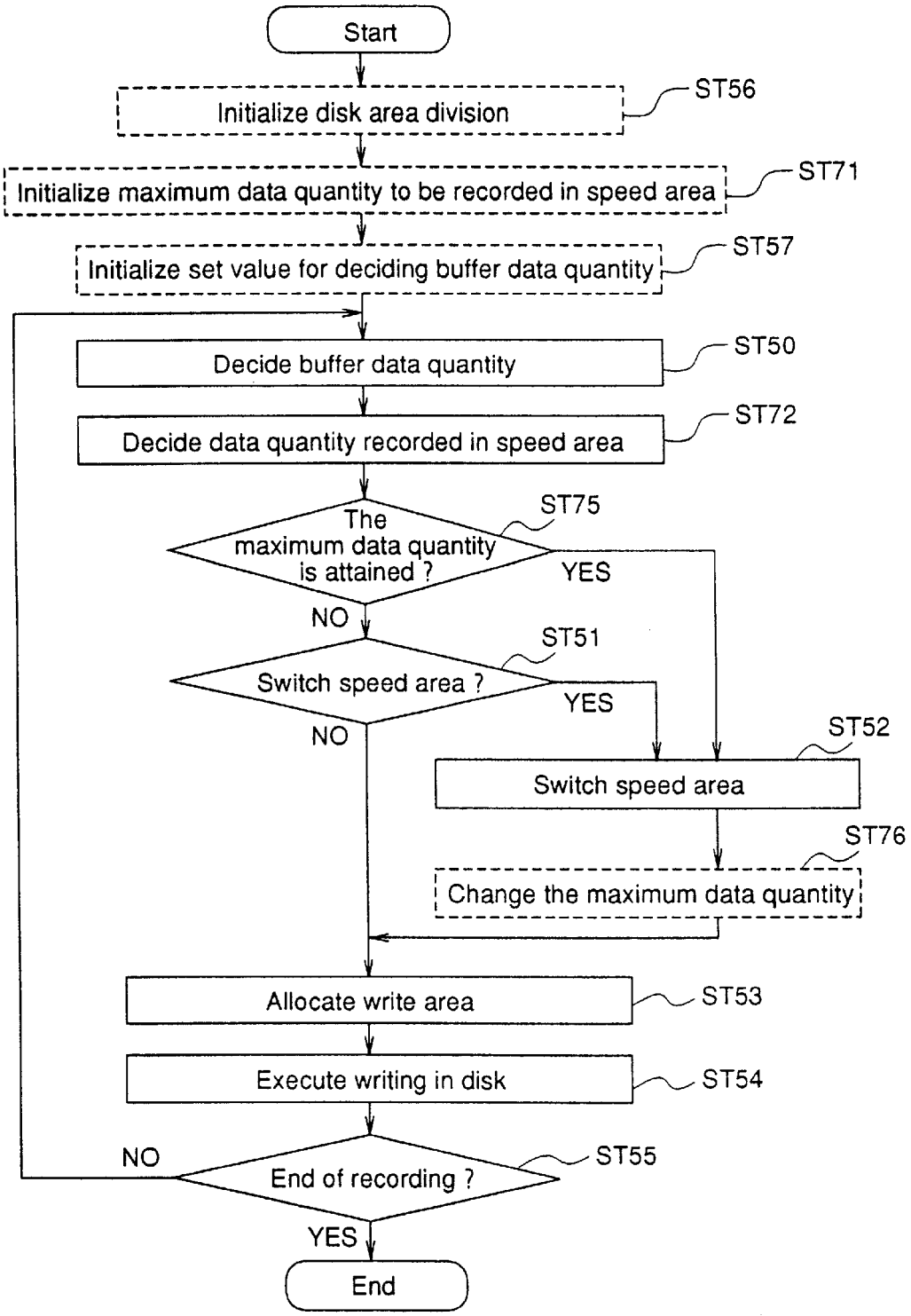
FIG. 19 is a flowchart showing how to control a recording operation of a recording device according to a tenth embodiment of the invention.

FIG. 19 is a flowchart showing how to control a recording operation of a recording device according to a ninth embodiment of the present invention.

The recording device according to this ninth embodiment is characterized by the following point. When a speed area is selected, a minimum quantity of a sequence of data to be assigned to the speed area is set, thereby to avoid an increase in the ratio of seek time in recording due to frequent switching.

Figure 18:
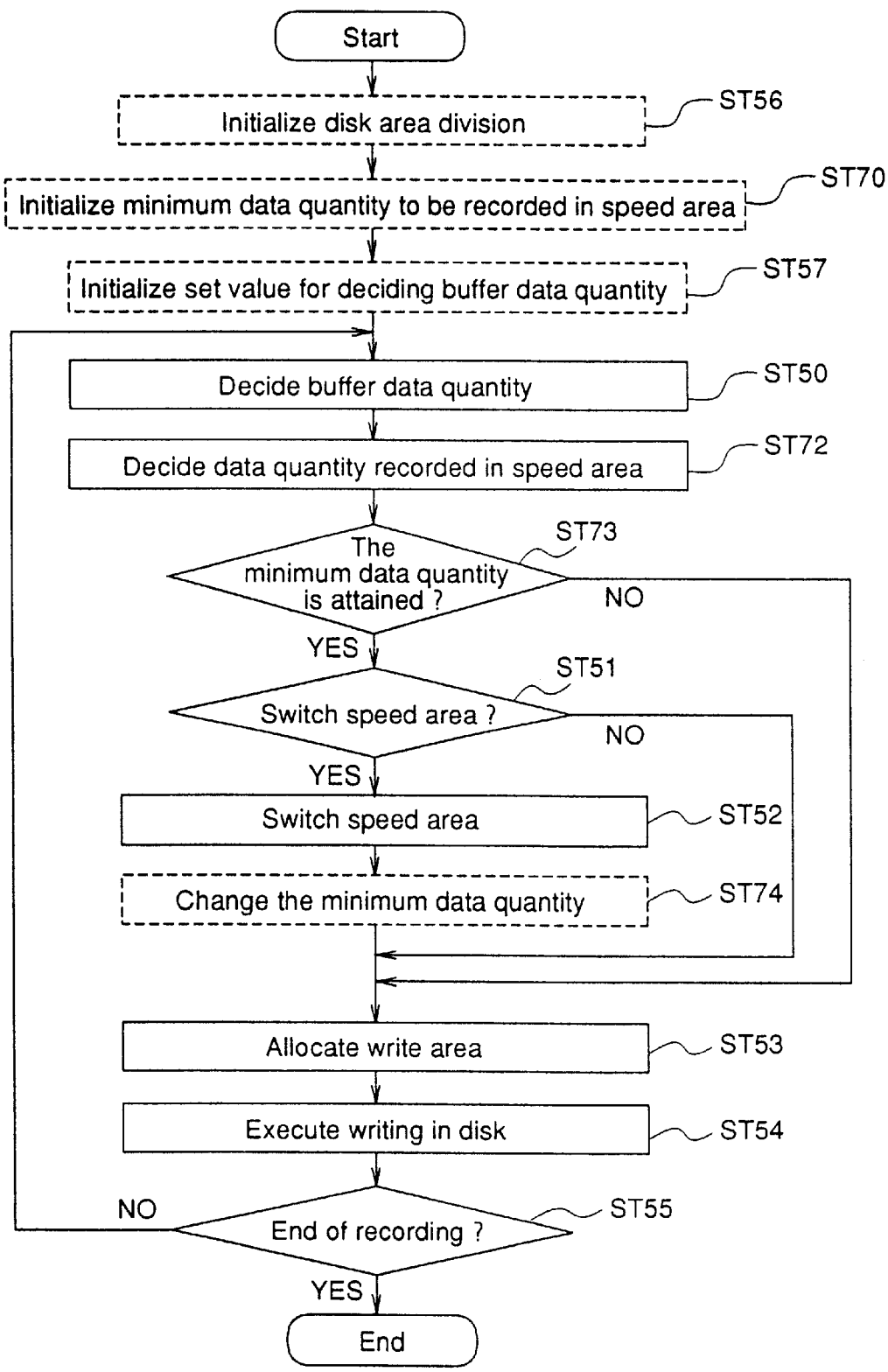
FIG. 18 is a flowchart showing how to control a recording operation of a recording device according to a ninth embodiment of the invention.

To be specific, with reference to FIG. 18, in the initialization process, when a speed area is selected, a minimum value of quantity of a sequence of data assigned to the speed area is set (speed area minimum data quantity initialization step ST70).

When data is written in the disk unit 5, after buffer data quantity decision step ST50, the quantity of a sequence of data recorded in the selected speed area is decided (speed area recorded data quantity decision step ST72). Thereafter, it is decided whether the data quantity decided in step ST72 exceeds the minimum data quantity set in step ST70 or not (minimum data amount attainment decision step ST73). Step ST73 is followed by speed area switching decision step ST51. When the decision in step ST51 is to switch the step area, speed area switching step ST52 is executed. Thereafter, as desired, with the switching of the speed area, the minimum data quantity set in step ST70 is changed for the next switching (speed area minimum data quantity change step ST74). Step ST74 is followed by write area allocation step ST53, disk writing execution step ST54, and recording end decision step ST55.

When it is decided in step ST73 that the data quantity decided in step ST72 does not exceed the minimum data quantity set in step ST70, or when it is decided in step ST51 that switching of the speed area should not be performed, steps ST52 and ST74 are not executed, and the control proceeds to step ST53.

As described above, according to the ninth embodiment of the invention, when a speed area is selected, a minimum quantity of data in a sequence assigned to the speed area is set. Therefore, unwanted increase in ratio of seek time due to frequent area-switching is avoided, whereby frequent use of a high-speed area is avoided. That is, since the frequency of the area-switching is controlled by setting the above-mentioned minimum data quantity, efficient use of the recording medium is secured.

[Embodiment 10]

FIG. 19 is a flowchart showing how to control a recording operation of a recording device according to a tenth embodiment of the invention.

In this tenth embodiment, when a speed area is selected, a maximum quantity of a sequence of data to be assigned to the speed area is set, thereby to avoid that a specific speed area is used up because of infrequent area-switching.

To be specific, with reference to FIG. 19, in the initialization process, when a speed area is selected, a maximum value of quantity of data in a sequence assigned to the speed area is set (speed area maximum data quantity initialization step ST71).

When data is written in the disk unit 5, after executing buffer data quantity decision step ST50 and speed area recorded data quantity decision step ST72, it is decided whether the data quantity obtained in step ST72 exceeds the maximum data quantity set in step ST71 or not (maximum data quantity attainment decision step ST75). When it is decided in step ST75 that the data quantity exceeds the maximum data quantity, or when it is decided in step ST51 that the speed area should be switched, speed area switching step ST52 is executed. Thereafter, as desired, with the switching of the speed area, the maximum data quantity set in step ST71 is changed for the next area-switching (speed-area maximum data amount change step ST76). Step ST76 is followed by write area allocation step ST53, disk writing execution step ST54, and recording end decision step ST55.

When it is judged in step ST51 that switching of the speed area should not be performed, steps ST52 and ST76 are not executed, and the control proceeds to step ST53.

As described above, according to a tenth embodiment of the present invention, when a speed area is selected, a maximum quantity of a sequence of data to be assigned to the speed area is set, so that switching of the speed area occurs. Therefore, it is avoided that a specific speed area is used up before the others. That is, since the area-switching is controlled by setting the above-mentioned maximum data quantity, efficient use of the recording medium is secured.

Further, the method of setting a minimum quantity of data in a sequence per speed area according to the ninth embodiment may be combined with the method of setting a maximum quantity of data in a sequence per speed area according to the tenth embodiment. Further, these methods may be applied to the recording methods described with respect to FIGS. 10, 12, 13 and 15 with the same effects as mentioned above.

[Embodiment 11]

Although continuous reading of data using less buffer memories at reproduction is realized by the aforementioned embodiments of the invention, it is desired to perform the reading operation with accuracy. For this purpose, this eleventh embodiment is proposed. Before describing the eleventh embodiment, requirements for reproduction will be described.

A method for improving data continuity at reproduction, with high accuracy, will be described hereinafter.

Generally, in the disk unit 5, the reproduction rate (readable data quantity per unit time) is two or more times of the recording rate, because, at recording, data written in a disk medium are read out for verification.

In this eleventh embodiment, to study the data continuity at reproduction, it is assumed that the respective speed areas have reproduction-rate performances twice as high as the recording-rate performances thereof shown in table 2, as shown in table 4.

TABLE 4

| reproduction rate | 500 kB/sec |
|---|---|
| reproduction-rate performance of area A | 600 kB/sec |
| reproduction-rate performance of area B | 880 kB/sec |
| reproduction-rate performance of area C | 1160 kB/sec |
| reproduction-rate performance of area D | 1440 kB/sec |

The speed areas are selected in the order of areaA areaB→areaD→areaC→areaA→ . . . , as shown in FIG. 9, and switching between adjacent areas takes a seek time of 200 ms (microsecond) and switching between areas with an area between them takes a seek time of 300 ms. The change rates of data in pre-read caches in the respective areas are shown on table 5.

TABLE 5

| change rate of area A | 100 kB/sec |
|---|---|
| change rate of area B | 380 kB/sec |
| change rate of area C | 660 kB/sec |
| change rate of area D | 940 kB/sec |

Variations in the pre-read caches during the seek time are shown on table 6.

TABLE 6

| 200 ms seek | 100 kB |
|---|---|
| 300 ms seek | 150 kB |

When the speed area is switched from the area A to the area B, data of at least 100 kB must be stored in the pre-read cache. Since the change rate of the pre-read cache in the area A is 100 kB/sec, the area A must have a sequence of data that can be read continuously for at least 1 second.

When switching from the area B to the area D, data of at least 150 kB must be stored in the pre-read cache. Since the change rate of the pre-read cache in the area B is 380 kB/sec, the area B must have a sequence of data that can be read continuously for at least 0.4 second.

When switching from the area D to the area C, data of at least 100 kB must be stored in the pre-read cache. Since the change rate of the pre-read cache in the area D is 940 kB/sec, the area D must have a sequence of data that can be read continuously for at least 0.11 second.

When switching from the area C to the area D, data of at least 150 kB must be stored in the pre-read cache. Since the change rate of the pre-read cache in the area C is 660 kB/sec, the area C must have a sequence of data that can be read continuously for at least 0.23 second. Alternatively, assuming that the capacity of the pre-read cache is 250 kB, when the pre-read cache has been filled up just before switching from the area C to the area A, the data quantity in the pre-read cache immediately after seeking is 100 kB, so that the limitation given to the minimum quantity of continuous data in the area A is eased. In any case, the data quantity assigned by a sequence of data, required for each speed area, can be evaluated from the reproduction rate, the seek time required for speed-area switching, and a difference between the reproduction-rate performance of each speed area and the reproduction rate.

Figure 21:
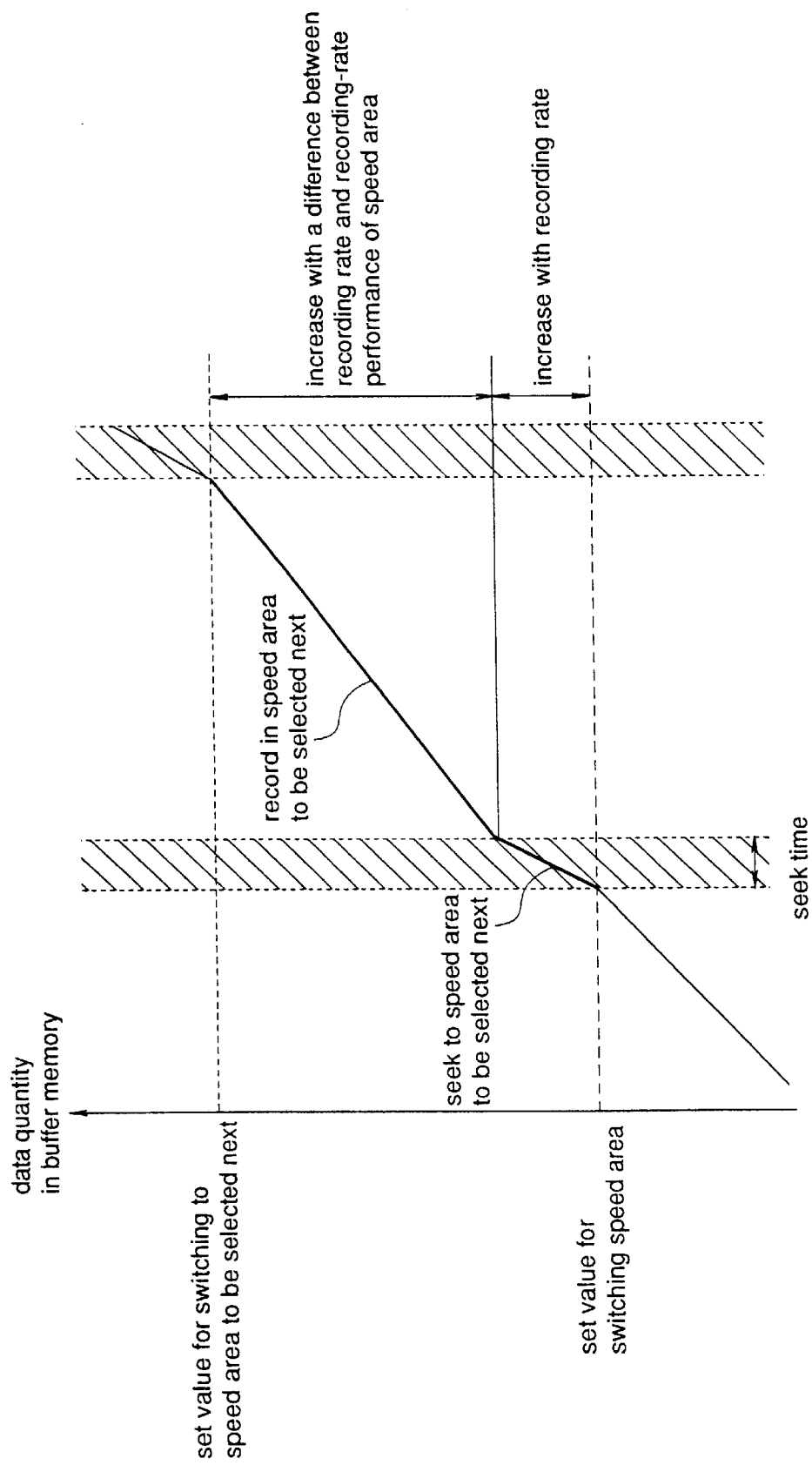
FIG. 21 is a diagram for explaining the relationship between the quantity of data in a sequence assigned to the speed area and a set value for area-switching.

As shown in FIG. 21, a set value to be compared with the data quantity in the buffer memory 2 is obtained by adding the data quantity that increases at the recording rate during the speed-area switching time to the data quantity that increases by a difference between the recording rate and the recording-rate performance of a selected area during the period for recording a prescribed data quantity in the selected speed area, and adding the result of the addition to the set value for the previous speed-area switching.

Figure 20:
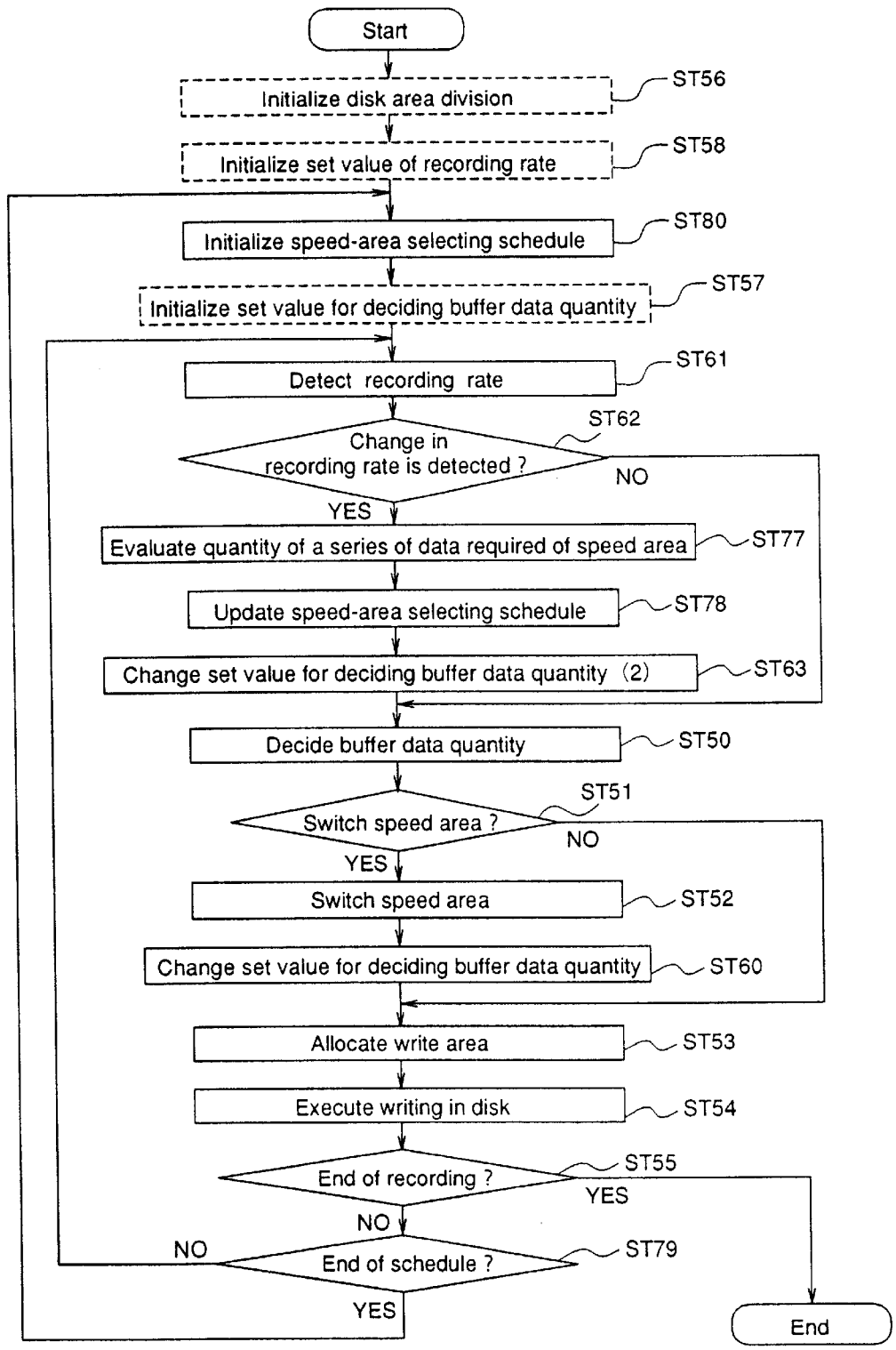
FIG. 20 is a flowchart showing how to control a recording operation of a recording device according to an eleventh embodiment of the invention.

FIG. 20 is a flowchart showing how to control the recording operation of the recording device according to the eleventh embodiment of the invention.

After executing disk area division initialization step ST56 and recording rate set value initialization step ST58, speed areas to be selected and the order of these speed areas are decided (speed-area selection schedule initialization step ST80). Thereafter, buffer data quantity deciding set value initialization step ST57 is executed.

The operation for writing data in the disk unit 5 is controlled as follows. Initially, recording rate detection step ST61 and recording rate change detection step ST62 are executed. When it is detected in step ST62 that the recording rate is changed, the recording rate, the reproduction-rate performance of each speed area, and the time required for switching the speed area are evaluated to decide a data quantity assigned by a sequence of data and requested for each speed area (speed area serial data evaluating step ST77). After the evaluation in step ST77, speed areas to be selected are changed and the order is set (speed area selection schedule change step ST78). Thereafter, the data quantity in the buffer memory 2 used for successively switching the selected speed areas is changed (buffer data quantity deciding set value change step ST63). Step ST63 is followed by buffer data quantity decision step ST50, speed area switching decision step ST51, speed area switching step ST52, buffer data quantity deciding set value change step ST60, write area allocation step ST53, disk writing executing step ST54, and recording end decision step ST55.

When the decision in step ST55 is that the recording is not ended yet, it is decided whether the schedule of the speed areas is completed or not (speed-area selection schedule end decision step ST79). When the decision in step ST79 is that the schedule has been completed, the control returns to speed area selection schedule initialization step ST80. When the decision in step ST79 is that the schedule is not completed yet, the control returns to recording rate detecting step ST61 to continue the recording.

As described above, according to the eleventh embodiment of the invention, in order to secure the continuity of data at reproduction, the quantity of a sequence of data to be assigned to each speed area according to the recording rate is evaluated, speed areas to be selected are decided from a change in data quantity in the buffer memory 2 when recording that satisfies the data quantity is carried out and from the capacity of the buffer memory 2, and the order of the selected areas is decided, in advance of setting the data quantity in the buffer memory 2 for switching between the speed areas. Therefore, continuous and real-time reading of data is realized at reproduction. That is, speed areas to be selected are scheduled in advance on the basis of the capacity of the buffer memory 2 and the quantity of a sequence of data requested for each speed area at reproduction, which quantity is obtained from a difference between the recording-rate performance of each area and the recording rate requested and from a time required for the speed-area switching, whereby the data reading efficiency at reproduction is improved, and real-time reading of data at reproduction is realized with less quantity of data memory or less pre-read caches.

Further, by selecting a speed area of one cycle, balanced recording rate is realized to a specific recording rate and a specific buffer memory capacity.

Any of the aforementioned embodiments can be realized by a program. When such a program is recorded on a recording medium such as a floppy disk and transferred, or connected to network or data communication and transferred from another computer system, the program can be implemented easily by an independent computer system.

The present invention is not restricted to the aforementioned embodiments, and it is obvious that other designs, changes, and corrections can be added to the present invention.

Furthermore, although in the aforementioned embodiments HDDs are employed as recording media, the present invention can be applied to data transfer between RAMs of different transfer rates, or between memory units of different recording-rate performances, such as an HDD and an optical disk.

What is claimed is:

1. A recording device for recording data in a recording/reproduction device using a recording medium in which the recording-rate performance showing the recordable data quantity per unit time varies area to area, said recording device comprising:

a data memory unit for temporarily storing data to be recorded;

a data quantity management unit for managing the quantity of data in the memory unit, and requesting execution of writing data in the recording medium;

a medium area management unit for managing an available area in the recording medium, and deciding a data write position;

a data transfer control unit for controlling transfer of data from the data memory unit to the recording/reproduction device according to the write position generated by the medium area management unit;

said medium area management unit including an area-division management means for dividing the recording medium into plural speed areas of different recording-rate performances, and managing the speed areas; and said data quantity management unit including a recording rate control means for setting a rate of recording the data stored in the data memory unit according to the quantity of the data stored in the data memory unit;

wherein the speed areas on which data are to be recorded are switched on the basis of the recording rate set by the recording rate control means.

2. The recording device of claim 1 wherein the area-division management means divides the recording medium into plural regions according to address at recording of data into the medium, thereby forming said speed areas.

3. The recording device of claim 1 wherein:

the area-division management means divides the recording medium into a high-speed area and a low-speed area according to the recording-rate performances of the respective areas, and manages these areas;

the data quantity management unit has first and second set values to be compared with the quantity of data in the data memory unit; and the recording-rate control means generates a request to switch the recording area from the low-speed area to the high-speed area when it is decided that the data quantity in the data memory unit exceeds the first set value for switching to the high-speed area, while it generates a request to switch the speed area from the high-speed area to the low-speed area when it is decided that the data quantity in the data memory unit is lower than the second set value for switching to the low-speed area.

4. The recording device of claim 1 wherein:

the division of the recording medium into plural speed areas by the area-division management unit is to divide the medium into N+1 areas from a lowest-speed area, according to the recording-rate performances of the respective areas;

the data quantity management unit has N pieces of first set values and N pieces of second set values to be compared with the data quantity in the data memory unit, respectively corresponding to N pieces of speed-area boundaries produced by the N+1 pieces of speed areas; and the recording-rate control means generates a request to switch the recording area to the (S+1)th speed area when it is decided that the data quantity in the data memory unit exceeds the S-th first set value, while it generates a request to switch the recording area to the T-th speed area when it is decided that the data quantity in the data memory unit is lower than the T-th second set value.

5. The recording device of claim 1 wherein:

the data quantity management unit has first and second set values to be compared with the quantity of data stored in the data memory unit, which values are updated at the speed-area switching;

the recording-rate control means generates a first request to switch the recording area to a higher-speed area when it is decided that the data quantity in the data memory unit exceeds the first set value for switching to a higher-speed area, while it generates a second request to switch the recording area to a lower-speed area when it is decided that the data quantity in the data memory unit is lower than the second set value for switching to a lower-speed area; and the area-division management means switches the speed area being currently selected to a higher-speed area in response to the first request, and switches the speed-area being currently selected to a lower-speed area in response to the second request.

6. The recording device of claim 1 wherein:

the division of the medium into plural speed areas by the area-division management unit is to divide the medium into N pieces of speed areas from a lowest-speed area according to the recording-rate performances of the respective areas;

the data quantity management unit includes a recording rate setting/detecting means for setting or detecting a recording rate that shows a data quantity per unit time, requested to be recorded;

the area-division management means includes a speed-area grouping means for grouping the speed areas into which the medium is divided, into two groups, i.e., a high-speed area group comprising S to N pieces of speed areas whose recording-rate performances are higher than the recording rate and a low-speed area group comprising 1 to T pieces of speed areas whose recording-rate performances are lower than the recording rate; and after establishing an effective grouping with respect to the recording rate by the speed-area grouping means, the area-division management means receives a request to switch the recording area to a higher-speed area from the recording-rate control means and selects a speed area in the high-speed area group in a prescribed order, while it receives a request to switch the recording area to a lower-speed area from the recording-rate control means and selects a speed area in the low-speed area group in a prescribed order.

7. The recording device of claim 6 wherein the recording rate setting/detecting means detects that a speed area lower than the recording rate is being selected by detecting that the quantity of data in the data memory unit increases, and it detects that a speed area higher than the recording rate is being selected by detecting that the quantity of data in the data memory unit decreases.

8. The recording device of claim 6 wherein the recording rate setting/detecting means sets the recording rate according to a variation per unit time in the data quantity in the data memory unit or the data quantity per unit time input to the data memory unit.

9. The recording device of claim 6 wherein:

the data quantity management unit has a pair of inter-group switching set values for switching between the speed-area groups, and a pair of intra-group switching set values for switching between the speed areas in a selected speed-area group;

the recording-rate control means generates a request to switch the recording area group from the low-speed area group to the high-speed area group when it is decided that the data quantity in the data memory unit exceeds one of the inter-group switching set values that is for switching to the high-speed area group;

the recording-rate control means generates a request to switch the recording area group from the high-speed area group to the low-speed area group when it is decided that the data quantity in the data memory unit is lower than one of the inter-group switching set values that is for switching to the low-speed area group;

the recording-rate control means generates a request to switch the speed area being currently selected to a higher-speed area within the selected area group when it is decided that the data quantity in the data memory unit exceeds one of the intra-group switching set values that is for switching the selected speed area to a higher-speed area in the selected group; and the recording-rate control means generates a request to switch the speed area being currently selected to a lower-speed area within the selected area group when it is decided that the data quantity in the data memory unit is lower than one of the intra-group switching set values that is for switching the selected speed area to a lower-speed area in the selected group.

10. The recording device of claim 6 wherein, in each of the area groups, the area-division management means performs said selection in the order from a speed area of a largest difference between its recording-rate performance and the recording rate to a speed area of a smallest difference between its recording-rate performance and the recording rate.

11. The recording device of claim 6 wherein a method of grouping the speed areas is changed with a change in the recording rate.

12. The recording device of claim 1 wherein:

the area-division management means includes an area-speed catalog means for dividing the medium into N pieces of speed areas from a lowest-speed area according to recording-rate performances of the respective areas, and cataloging the recording-rate performances of the respective speed areas or differences between the recording rate and the respective recording-rate performances; and on the basis of the information cataloged in the area-speed catalog means, the differences between the recording rate and the recording-rate performances are evaluated to select a speed area.

13. The recording device of claim 1 wherein:

the data quantity management unit includes a recording rate setting/selecting means for setting or detecting the recording rate;

the area-division management means includes a speed-area grouping means for grouping the speed areas into which the medium is divided, into two groups, i.e., a high-speed area group comprising speed areas whose recording-rate performances are higher than the recording rate and a low-speed area group comprising speed areas whose recording-rate performances are lower than the recording rate, and the order of speed areas to be selected for switching in one of the area groups is the forward order of addresses of recording/reproduction blocks in the recording/reproduction device while the order of speed areas to be selected for switching in the other area group is the backward order of addresses of recording/reproduction blocks in the recording/reproduction device;

the data quantity management unit has a pair of inter-group switching set values for switching between the speed-area groups, and a pair of intra-group switching set values for switching between the speed areas in a selected speed-area group;

the recording-rate control means generates a request to switch the recording area group from the low-speed area group to the high-speed area group when it is decided that the data quantity in the data memory unit exceeds one of the inter-group switching set values that is for switching to the high-speed area group;

the recording-rate control means generates a request to switch the recording area group from the high-speed area group to the low-speed area group when it is decided that the data quantity in the data memory unit is lower than one of the inter-group switching set values that is for switching to the low-speed area group;

the recording-rate control means selects the speed areas in the selected area group in the order set by the speed-area grouping means when it is decided that the data quantity in the data memory unit is larger than or smaller than the intra-group switching set values; and the time required for the speed-area switching increases with an increase in variation in the addresses corresponding to the recording/reproduction blocks of the recording/reproduction device.

14. The recording device of claim 1 wherein a method of dividing the medium into plural speed areas is changed with a change in the recording rate.

15. The recording device of claim 1 wherein the set value of the data quantity management unit changes with a change in the recording rate.

16. The recording device of claim 1 wherein:

the data quantity management unit includes a recording rate setting/detecting means for setting or detecting the recording rate;

the area-division management unit includes a speed area selecting means for evaluating a quantity of data to be recorded, requested to each of the speed areas, from a variation per unit time in the data quantity of the data memory unit, to the recording rate, in each of the speed areas, and from a time required for switching to the speed area, and selecting and scheduling a speed area corresponding to the capacity of the data memory unit, in each area group; and the set value for generating a request to switch the speed area selected by comparing the set value with the data quantity in the data memory unit is reset at every one cycle for selecting the low-speed area group and the high-speed area group, each by one time or several times.

17. The recording device of claim 1 wherein, when a speed area selected by the area-division management means is switched to an other speed area, the switching is performed according to a result of comparison of the quantity of data recorded in the selected speed area with a prescribed value.

18. The recording device of claim 1 wherein, when a speed area selected by the area-division management means is switched to another speed area, the switching is performed by detecting that the quantity of data recorded in the selected speed area exceeds a prescribed value.

19. A method of recording data in a recording/reproduction device using a recording medium in which the recording-rate performance showing the recordable data quantity per unit time varies area to area, said method comprising:

a data memory step of temporarily storing data to be recorded;

a data quantity management step of managing the quantity of data in the data memory step, and requesting execution of writing data in the recording medium;

a medium area management step of managing an available area in the recording medium, and deciding a data write position;

a data transfer control step of controlling transfer of data from the data memory step to the recording/reproduction device according to the write position generated in the medium area management step;

said medium area management step including an area-division management step of dividing the recording medium into plural speed areas of different recording-rate performances, and managing the speed areas; and said data quantity management step including a recording rate control step of setting a rate of recording the data stored in the data memory step according to the quantity of the data stored in the data memory step;

wherein the speed areas on which data are to be recorded are switched on the basis of the recording rate set in the recording rate control step.

20. The method of claim 19 wherein the area-division management step divides the recording medium into plural regions according to address at recording of data into the medium, thereby forming said speed areas.

21. The method of claim 19 wherein:
the area-division management step divides the recording medium into a high-speed area and a low-speed area according to the recording-rate performances of the respective areas, and manages these areas;
the data quantity management step has first and second set values to be compared with the quantity of data in the data memory step; and
the recording-rate control step generates a request to switch the recording area from the low-speed area to the high-speed area when it is decided that the data quantity in the data memory step exceeds the first set value for switching to the high-speed area, while it generates a request to switch the recording area from the high-speed area to the low-speed area when it is decided that the data quantity in the data memory step is lower than the second set value for switching to the low-speed area.

22. The method of claim 19 wherein:
the division of the recording medium into plural speed areas in the area-division management step is to divide the medium into N+1 areas from a lowest-speed area, according to the recording-rate performances of the respective areas;
the data quantity management step has N pieces of first set values and N pieces of second set values to be compared with the data quantity in the data memory step, respectively corresponding to N pieces of speed-area boundaries produced by the N+1 pieces of speed areas; and
the recording-rate control step generates a request to switch the recording area to the (S+1)th speed area when it is decided that the data quantity in the data memory step exceeds the S-th first set value, while it generates a request to switch the recording area to the T-th speed area when it is decided that the data quantity in the data memory step is lower than the T-th second set value.

23. The method of claim 19 wherein:
the data quantity management step has first and second set values to be compared with the quantity of data stored in the data memory step, which values are updated at the speed-area switching;
the recording-rate control step generates a first request to switch the recording area to a higher-speed area when it is decided that the data quantity in the data memory step exceeds the first set value for switching to a higher-speed area, while it generates a second request to switch the recording area to a lower-speed area when it is decided that the data quantity in the data memory step is lower than the second set value for switching to a lower-speed area; and
the area-division management step switches the speed area being currently selected to a higher-speed area in response to the first request, and switches the speed-area being currently selected to a lower-speed area in response to the second request.

24. The method of claim 19 wherein:
the division of the medium into plural speed areas in the area-division management step is to divide the medium into N pieces of speed areas from a lowest-speed area according to the recording-rate performances of the respective areas;
the data quantity management step includes a recording rate setting/detecting step of setting or detecting a recording rate that shows a data quantity per unit time, requested to be recorded;
the area-division management step includes a speed-area grouping step for grouping the speed areas into which the medium is divided, into two groups, i.e., a high-speed area group comprising S to N pieces of speed areas whose recording-rate performances are higher than the recording rate and a low-speed area group comprising 1 to T pieces of speed areas whose recording-rate performances are lower than the recording rate; and
after establishing an effective grouping with respect to the recording rate in the speed-area grouping step, the area-division management step receives a request to switch the recording area to a higher-speed area from the recording-rate control step and selects a speed area in the high-speed area group in a prescribed order, while it receives a request to switch the recording area to a lower-speed area from the recording-rate control step and selects a speed area in the low-speed area group in a prescribed order.

25. The method of claim 24 wherein the recording rate setting/detecting step detects that a speed area lower than the recording rate is being selected by detecting that the quantity of data in the data memory unit increases, and it detects that a speed area higher than the recording rate is being selected by detecting that the quantity of data in the data memory unit decreases.

26. The method of claim 24 wherein the recording rate setting/detecting step sets the recording rate according to a variation per unit time in the data quantity in the data memory step or the data quantity per unit time input to the data memory step.

27. The method of claim 24 wherein:
the data quantity management step has a pair of inter-group switching set values for switching between the speed-area groups, and a pair of intra-group switching set values for switching between the speed areas in a selected speed-area group;
the recording-rate control step generates a request to switch the recording area from the low-speed area group to the high-speed area group when it is decided that the data quantity in the data memory step exceeds one of the inter-group switching set values that is for switching to the high-speed area group;
the recording-rate control step generates a request to switch the recording area from the high-speed area group to the low-speed area group when it is decided that the data quantity in the data memory step is lower than one of the inter-group switching set values that is for switching to the low-speed area group;
the recording-rate control step generates a request to switch the speed area being currently selected to a higher-speed area within the selected area group when it is decided that the data quantity in the data memory step exceeds one of the intra-group switching set values that is for switching the selected speed area to a higher-speed area in the selected group; and the recording-rate control step generates a request to switch the speed area being currently selected to a lower-speed area within the selected area group when it is decided that the data quantity in the data memory step is lower than one of the intra-group switching set values that is for switching the selected speed area to a lower-speed area in the selected group.

28. The method of claim 24 wherein, for each of the area groups, the area-division management step performs said selection in the order from a speed area of a largest difference between its recording-rate performance and the recording rate to a speed area of a smallest difference between its recording-rate performance and the recording rate.

29. The method of claim 24 wherein a method of grouping the speed areas is changed with a change in the recording rate.

30. The method of claim 19 wherein:

the area-division management step includes an area-speed catalog step for dividing the medium into N pieces of speed areas from a lowest-speed area according to recording-rate performances of the respective areas, and cataloging the recording-rate performances of the respective speed areas or differences between the recording rate and the respective recording-rate performances; and on the basis of the information cataloged in the area-speed catalog step, the differences between the recording rate and the recording-rate performances are evaluated to select a speed area.

31. The method of claim 19 wherein:

the data quantity management step includes a recording rate setting/selecting step for setting or detecting the recording rate;

the area-division management step includes a speed-area grouping step for grouping the speed areas into which the medium is divided, into two groups, i.e., a high-speed area group comprising speed areas whose recording-rate performances are higher than the recording rate and a low-speed area group comprising speed areas whose recording-rate performances are lower than the recording rate, and the order of speed areas to be selected for switching in one of the area groups is the forward order of addresses of recording/reproduction blocks in the recording/reproduction device while the order of speed areas to be selected for switching in the other area group is the backward order of addresses of recording/reproduction blocks in the recording/reproduction device;

the data quantity management step has a pair of inter-group switching set values for switching between the speed-area groups, and a pair of intra-group switching set values for switching between the speed areas in a selected speed-area group;

the recording-rate control step generates a request to switch the recording area group from the low-speed area group to the high-speed area group when it is decided that the data quantity in the data memory step exceeds one of the inter-group switching set values that is for switching to the high-speed area group;

the recording-rate control step generates a request to switch the recording area group from the high-speed area group to the low-speed area group when it is decided that the data quantity in the data memory step is lower than one of the inter-group switching set values that is for switching to the low-speed area group;

the recording-rate control step selects the speed areas in the selected area group in the order set in the speed-area grouping step when it is decided that the data quantity in the data memory step is larger than or smaller than the intra-group switching set values; and the time required for the speed-area switching increases with an increase in variation in the addresses corresponding to the recording/reproduction blocks of the recording/reproduction device.

32. The method of claim 19 wherein a method of dividing the medium into plural speed areas is changed with a change in the recording rate.

33. The method of claim 19 wherein the set value in the data quantity management step changes with a change in the recording rate.

34. The method of claim 19 wherein:

the data quantity management step includes a recording rate setting/detecting step for setting or detecting the recording rate;

the area-division management step includes a speed area selecting step in which a quantity of data to be recorded, requested to each of the speed areas, is evaluated from a variation per unit time in the data quantity in the data memory step, to the recording rate, in each of the speed areas, and a time required for switching to the speed area and, thereafter, a speed area corresponding to the capacity of the data memory step is selected from each area group and scheduled; and the set value for generating a request to switch the speed area selected by comparing the set value with the data quantity in the data memory step is reset at every one cycle for selecting the low-speed area group and the high-speed area group, each by one time or several times.

35. The method of claim 19 wherein, when a speed area s elected in the area-division management step is switched to another speed area, the switching is performed according to a result of comparison of the quantity of data recorded in the selected speed area with a prescribed value.

36. The method of claim 19 wherein, when a speed area selected in the area-division management step is switched to another speed area, the switching is performed by detecting that the quantity of data recorded in the selected speed area exceeds a prescribed value.

* * * * *